US012271687B2

(12) United States Patent
Sarkar et al.

(10) Patent No.: US 12,271,687 B2
(45) Date of Patent: Apr. 8, 2025

(54) TABLE COLUMN OPERATIONS FOR SPREADSHEETS

(71) Applicant: Microsoft Technology Licensing, LLC, Redmond, WA (US)

(72) Inventors: Advait Sarkar, Cambridge (GB); George Chalhoub, Oxford (GB); Christopher Evan Oslund, Seattle, WA (US); Christian Mendel Canton, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/833,247

(22) Filed: Jun. 6, 2022

(65) Prior Publication Data

US 2023/0325587 A1    Oct. 12, 2023

Related U.S. Application Data

(60) Provisional application No. 63/328,625, filed on Apr. 7, 2022.

(51) Int. Cl.
*G06F 40/00* (2020.01)
*G06F 16/28* (2019.01)
*G06F 40/18* (2020.01)

(52) U.S. Cl.
CPC ............ *G06F 40/18* (2020.01); *G06F 16/287* (2019.01)

(58) Field of Classification Search
CPC ....................................................... G06F 40/18
See application file for complete search history.

(56) References Cited

U.S. PATENT DOCUMENTS

| 7,127,672 | B1 | 10/2006 | Patterson et al. |
| 7,792,847 | B2 | 9/2010 | Dickerman et al. |
| 9,378,198 | B2 | 6/2016 | Vigesaa et al. |
| 10,095,679 | B2 | 10/2018 | Gur et al. |
| 10,120,851 | B2 | 11/2018 | Naor |

(Continued)

OTHER PUBLICATIONS

Paste Options, Excel for Microsoft 365, Excel for the web, Excel 2019, Excel 2013, archived Dec. 3, 2020, 8 pages, retrieved at https://web.archive.org/web/20201203234643/https://support.microsoft.com/en-us/office/paste-options-8ea795b0-87cd-46af-9b59-ed4d8b1669ad. (Year: 2020).*

(Continued)

*Primary Examiner* — Barbara M Level

(57) ABSTRACT

Various embodiments of the present technology generally relate to enhancements to spreadsheet tables. More specifically, embodiments of the present technology include systems and methods for incorporating various table column operations into table columns headers, thereby simplifying the act of propagating a desired effect across a range that exactly matches the table column. In an embodiment, a spreadsheet application detects a cell event in a spreadsheet, wherein the cell event affects one or more cells of the spreadsheet, determines that a cell of the one or more cells is inside a range that makes up a table in the spreadsheet, identifies a table column of the table to which the cell belongs, identifies metadata for the table column, wherein the metadata for the table column comprises column configuration instructions, and applies the column configuration instructions to the cell.

20 Claims, 46 Drawing Sheets

(56) References Cited

U.S. PATENT DOCUMENTS

| | | | | |
|---|---|---|---|---|
| 11,222,161 | B1* | 1/2022 | Harvey | G06F 40/103 |
| 11,222,171 | B2 | 1/2022 | Zhang et al. | |
| 2002/0103825 | A1* | 8/2002 | Bauchot | G06F 40/18 715/226 |
| 2006/0212469 | A1* | 9/2006 | Babanov | G06F 40/18 707/999.102 |
| 2008/0243823 | A1 | 10/2008 | Baris et al. | |
| 2009/0106310 | A1* | 4/2009 | Lanza | G06F 40/18 |
| 2011/0072340 | A1* | 3/2011 | Miller | G06F 40/18 715/220 |
| 2012/0137203 | A1* | 5/2012 | Schodl | G06F 40/18 715/219 |
| 2013/0124960 | A1* | 5/2013 | Velingkar | G06F 40/18 715/220 |
| 2014/0115434 | A1* | 4/2014 | Chirilov | G06F 40/18 715/217 |
| 2014/0372851 | A1* | 12/2014 | Rutherford | G06F 40/18 715/212 |
| 2015/0186352 | A1* | 7/2015 | Greenwood | G06F 40/14 715/217 |
| 2015/0261794 | A1* | 9/2015 | Lehrian | G06F 40/18 707/807 |
| 2016/0085735 | A1* | 3/2016 | Davis | G06F 16/2365 715/746 |
| 2018/0004722 | A1* | 1/2018 | Naor | G06F 16/93 |
| 2018/0239748 | A1* | 8/2018 | Zhang | G06F 3/0482 |
| 2020/0265040 | A1* | 8/2020 | Jung | G06F 16/9024 |
| 2021/0397420 | A1 | 12/2021 | Stachura | |

OTHER PUBLICATIONS

Scaffidi, et al., "Estimating the Numbers of End Users and End User Programmers", In Proceedings of IEEE Symposium on Visual Languages and Human-Centric Computing (VL/HCC'05), Sep. 20, 2005, 8 Pages.

Hermans, et al., "Automatically Extracting Class Diagrams from Spreadsheets", In Proceedings of the 24th European Conference on Object-oriented Programming, Jun. 21, 2010, 30 Pages.

Hermans, et al., "Detecting and refactoring code smells in spreadsheet formulas", In Journal Empirical Software Engineering, vol. 20, Issue 2, Apr. 1, 2015, 30 Pages.

Hermans, et al., "Enron's Spreadsheets and Related Emails: A Dataset and Analysis", In Proceedings of the IEEE/ ACM 37th IEEE International Conference on Software Engineering, May 16, 2015, pp. 7-16.

Herndon, et al., "Does High Public Debt Consistently Stifle Economic Growth? A Critique of Reinhart and Rogoff", In Cambridge Journal of Economics, vol. 38, Issue 2, Mar. 1, 2014, 23 Pages.

Howard, Philip, "Managing Spreadsheets", In White Paper of Bloor Research, Apr. 2005, 18 Pages.

Izza, Michael, "Twenty Principles for Good Spreadsheet Practice", In Proceedings of Information Technology Faculty, Aug. 4, 2014, 20 Pages.

Vertesi, Janet , "Seamful Spaces: Heterogeneous Infrastructures in Interaction", In Journal of Science, Technology, & Human Values, vol. 39, Issue 2, Jan. 22, 2014, 21 Pages.

Joharizadeh, et al., "Gridlets: Reusing Spreadsheet Grids", In Proceedings of Extended Abstracts of the CHI Conference on Human Factors in Computing Systems, Apr. 25, 2020, 7 Pages.

Jones, et al., "A User-Centred Approach to Functions in Excel", In Proceedings of the 8th ACM SIGPLAN International Conference on Functional Programming, Aug. 25, 2003, pp. 165-176.

Jones, Brian, "Announcing LAMBDA: Turn Excel formulas into Custom Functions", Retrieved From : https://techcommunity.microsoft.com/t5/excel-blog/announcing-lambda-turn-excel-formulas-into-custom-functions/ba-p/1925546, Dec. 3, 2020, 27 Pages.

Kajornboon, Annabel B. , "Using Interviews as Research Instruments", In Publication of E-journal for Research Teachers, vol. 2, Issue 1, Jan. 2005, 10 Pages.

Kandel, et al., "Enterprise Data Analysis and Visualization: an Interview Study", In Journal of IEEE Transactions on Visualization and Computer Graphics, vol. 18, No. 12, Dec. 2012, 10 Pages.

Kandogan, et al., "From Data to Insight: Work Practices of Analysts in the Enterprise", In Journal of IEEE Computer Graphics and Applications, vol. 34, Issue 5, Sep. 2014, pp. 42-50.

Kerry, et al., "Exploring Exploratory Programming", In Proceedings of IEEE Symposium on Visual Languages and Human-Centric Computing (VL/HCC), Oct. 11, 2017, pp. 25-29.

Koskei, et al., "Role of Interviews, Observation, Pitfalls and Ethical Issues in Qualitative Research Methods", In Journal of Educational Policy and Entrepreneurial Research, vol. 2, Issue 3, Mar. 2015, pp. 108-117.

Kraus, Lydia, "User Experience with Mobile Security and Privacy Mechanisms", In Thesis Submitted to Technical University of Berlin, Jul. 4, 2017, 221 Pages.

Liu, et al., "Making Sense of Data Workers' Sense Making Practices", In Proceedings of the ACM CHI Workshop on Sense making in a Senseless World, May 3, 2019, 5 Pages.

Liu, et al., "Workflow-Based Human-in-the-Loop Data Analytics", In Proceedings of the Workshop on Human Centered Big Data Research, Apr. 1, 2014, 5 Pages.

MacKay, Wendye. , "Triangulation within and Across HCI Disciplines", In Journal of Human-Computer Interaction vol. 13, Issue 3, Jan. 1, 1998, 5 Pages.

Mazmanian, et al., "Dynamic Reconfiguration in Planetary Exploration: a Sociomaterial Ethnography", In Journal of MIS Quarterly, vol. 38, Issue 3, Sep. 1, 2014, 27 Pages.

McCutchen, et al., "Elastic Sheet-Defined Functions: Generalising Spreadsheet Functions to Variable-Size Input Arrays", In Journal of Functional Programming, vol. 30, Aug. 21, 2020, 66 Pages.

McCutchen, et al., "Object Spreadsheets: a New Computational Model for End-User Development of Data-Centric Web Applications", In Proceedings of the ACM International Symposium on New Ideas, New Paradigms, and Reflections on Programming and Software, Nov. 2, 2016, pp. 112-127.

McHugh, Mary L. , "Interrater Reliability: The Kappa Statistic", In Journal of Biochemia Medica, vol. 22, Issue 3, Oct. 15, 2012, pp. 276-282.

Mendes, et al., "Systematic Spreadsheet Construction Processes", In Proceedings of the IEEE Symposium on Visual Languages and Human-Centric Computing, Oct. 11, 2017, pp. 123-127.

Miller, et al., "Gradual structuring: Evolving the spreadsheet paradigm for expressiveness and learnability", In Proceedings of 15th International Conference on Information Technology Based Higher Education and Training (ITHET), Sep. 8, 2016, 8 Pages.

Miller, et al., "Sumwise: a Smarter Spreadsheet", In Proceedings of European Spreadsheet Risks Interest Group, Aug. 6, 2010, 7 Pages.

Muller, et al., "How Data Science Workers Work with Data: Discovery, Capture, Curation, Design, Creation", In Proceedings of the CHI Conference on Human Factors in Computing Systems, May 2, 2019, 14 Pages.

Nardi, et al., "Twinkling Lights and Nested Loops: Distributed Problem Solving and Spreadsheet Development", In Proceedings of International Journal of Man-Machine Studies, vol. 34, Issue 2, Feb. 1991, pp. 161-184.

Nunez, Fabian, "An Extended Spreadsheet Paradigm for Data Visualisation Systems, and Its Implementation", In Master's Thesis Submitted to University of Cape Town, Nov. 2000, 157 Pages.

Panko, et al., "Spreadsheets on Trial: a Survey of Research on Spreadsheet Risks", In Proceedings of HICSS-29: 29th Hawaii International Conference on System Sciences, Jan. 3, 1996, pp. 326-335.

Panko, et al., "What We Don't Know About Spreadsheet Errors Today: The Facts, Why we Don't Believe Them, and What we Need to Do", In Proceedings of the EuSpRIG Conference "Spreadsheet Risk Management", Feb. 2, 2016, 15 Pages.

Panko, Raymondr. , "What we know about spreadsheet errors", In Journal of Organizational and End User Computing, vol. 10, No. 2, Apr. 1, 1998, 33 Pages.

(56) References Cited

OTHER PUBLICATIONS

Dourish, Paul, "Spreadsheets and Spreadsheet Events in Organizational Life", In Book of the Stuff of Bits: an Essay on the Materialities of Information, Chapter 4, MIT Press, 2017, pp. 81-104.
Dourish, Paul, "The Stuff of Bits: an Essay on the Materialities of Information", In Publication of MIT Press, 2017, 246 Pages.
Pernice, Kara, "UX Prototypes: Low Fidelity vs. High Fidelity", Retrieved From : https://www.nngroup.com/articles/ux-prototype-hi-lo-fidelity/, Dec. 18, 2016, 11 Pages.
Pirolli, et al., "The Sensemaking Process and leverage Points for Analyst Technology as Identified Through Cognitive Task Analysis", In Proceedings of International Conference on Intelligence Analysis, vol. 5, May 2, 2005, 6 Pages.
Powell, et al., "A Critical Review of the Literature on Spreadsheet Errors", In Journal of Decision Support Systems, vol. 46, Issue 1, Dec. 1, 2008, pp. 128-138.
Raffensperger, Johnf. , "New Guidelines for Spreadsheets", In Publication of European Spreadsheet Risks Interest Group, May 22, 2001, pp. 61-76.
Ragavan, et al., "Spreadsheet Comprehension: Guesswork, Giving up and Going Back to the Author", In Proceedings of the 2021 CHI Conference on Human Factors in Computing Systems, May 7, 2021, 21 Pages.
Ragsdale, Cliff T, "Spreadsheet Modeling and Decision Analysis: a Practical Introduction to Business Analytics", In Publication of Cengage Learning, 2018, 869 Pages.
Roto, et al., "User Experience White Paper: Bringing Clarity to the Concept of user Experience", In Proceedings of Dagstuhl Seminar on Demarcating User Experience, Feb. 11, 2011, 12 Pages.
Russell, Danielm. , "Simple is Good: Observations of Visualization use Amongst the Big Data Digerati", In Proceedings of the International Working Conference on Advanced Visual Interfaces, Jun. 7, 2016, pp. 7-12.
Salovaara, et al., "Evaluation of Prototypes and the Problem of Possible Futures", In Proceedings of the CHI Conference on Human Factors in Computing Systems, May 6, 2017, pp. 2064-2077.
Jose, San, "Study Finds Spreadsheet Risk is Real; Businesses are Aware of the Risk—Yet Despite Relying on this Data to Make Key Business Decisions—the Risk is Ignored", Retrieved From : https://www.businesswire.com/news/home/20190612005248/en/Study-Finds-Spreadsheet-Risk-is-Real-Businesses-are-Aware-of-the-Risk%E2%80%94Yet-Despite-Relying-on-this-Data-to-Make-Key-Business-Decisions%E2%80%94the-Risk-is-Ignored, Jun. 12, 2019, 3 Pages.
Sarkar, et al., "Calculation View: Multiple-Representation Editing in Spreadsheets", In Proceedings of the IEEE Symposium on Visual Languages and Human-Centric Computing, Oct. 1, 2018, pp. 85-93.
Sarkar, et al., "How do People Learn to use Spreadsheets? (Work in progress)", In Proceedings of the 29th Annual Conference of the Psychology of Programming Interest Group, Sep. 5, 2018, pp. 28-35.
Sarkar, et al., "Interactive Analytical Modelling", In Technical Report of University of Cambridge, May 2018, 142 Pages.
Sarkar, et al., "Spreadsheet Use and Programming Experience: an Exploratory Survey", In Proceedings of the Extended Abstracts of the CHI Conference on Human Factors in Computing Systems, Apr. 25, 2020, 9 Pages.
Schultheis, et al., "The Relationship of Application Risks to Application Controls: a Study of Microcomputer-Based Spreadsheet Applications", In Journal of End User Computing, vol. 6, Issue 2, Apr. 1, 1994, pp. 11-18.
Bernhart, et al., "Patient Satisfaction in Developing Countries", In Journal of Social Science & Medicine, vol. 48, Issue 8, Apr. 1, 1999, pp. 989-996.
"Apply Data Validation to Cells", Retrieved From : https://web.archive.org/web/20211006094644/https://support.microsoft.com/en-us/office/apply-data-validation-to-cells-29fecbcc-d1b9-42c1-9d76-eff3ce5f7249, Oct. 6, 2021, 4 Pages.

"Create an in-cell Drop-Down List", Retrieved From : https://web.archive.org/web/20220713163322/https://support.google.com/docs/answer/186103?hl=en-GB&co=GENIE.Platform%3DDesktop, Jul. 13, 2022, 1 Page.
"Ergonomics of Human System Interaction-Part 210: Human-Centred Design for Interactive Systems", In Publication of International Standardization Organization (ISO), Mar. 15, 2010, 40 Pages.
"Featured OSF Project", Retrieved From : https://web.archive.org/web/20140210075729/https:/osf.io/, Feb. 10, 2014, 3 Pages.
"Guidelines for Organizing and Formatting Data on a Worksheet", Retrieved From : https://web.archive.org/web/20220606041132/https://support.microsoft.com/en-us/office/guidelines-for-organizing-and-formatting-data-on-a-worksheet-90895cad-6c85-4e02-90d3-8798660166e3, Jun. 6, 2022, 4 Pages.
"Import and export of data", Retrieved From: https://en.wikipedia.org/w/index.php?title=Import_and_export_of_data&oldid=1014138100, Mar. 25, 2021, 2 Pages.
"Results of On-line Survey of Spreadsheet Usage", In Proceedings of Spreadsheet Engineering Research Project (SERP), Mar. 10, 2006, 16 Pages.
"The FAST Standard Organisation", Retrieved From : https://web.archive.org/web/20190917060701/https://www.fast-standard.org/the-fast-standard/, Sep. 17, 2019, 4 Pages.
Abraham, et al., "Header and Unit Inference for Spreadsheets Through Spatial Analyses", In the Proceedings of the IEEE Symposium on Visual Languages and Human Centric Computing, Sep. 26, 2004, 8 Pages.
Ahmad, et al., "A Type System for Statically Detecting Spreadsheet Errors", In the Proceedings of 18th IEEE International Conference on Automated Software Engineering, Oct. 6, 2003, 10 Pages.
Alspaugh, et al., "Futzing and Moseying: Interviews with Professional Data Analysts on Exploration Practices", In the Journal of IEEE Transactions on Visualization and Computer Graphics, vol. 25, Issue 1, Jan. 2019, 10 Pages.
Bartram, et al., "Untidy Data: The Unreasonable Effectiveness of Tables", In Repository of arXiv:2106.15005v1, Jun. 28, 2021, 11 Pages.
Bigelow, et al., "Reflections on How Designers Design With Data", In the Proceedings of the 2014 International Working Conference on Advanced Visual Interfaces, May 27, 2014, pp. 17-24.
Blackwell, et al., "Champagne Prototyping: a Research Technique for Early Evaluation of Complex End-User Programming Systems", In Proceedings of the IEEE Symposium on Visual Languages and Human-Centric Computing, Sep. 26, 2004, 8 Pages.
Blackwell, Alan F. , "First Steps in Programming: a Rationale for Attention Investment Models", In Proceedings of the IEEE CS International Symposium on Human-Centric Computing Languages and Environments, Sep. 3, 2002, 9 Pages.
Boukhelifa, et al., "How Data Workers Cope with Uncertainty: a Task Characterisation Study", In the Proceedings of the 2017 CHI Conference on Human Factors in Computing Systems, May 6, 2017, pp. 3645-3656.
Braun, "Thematic Analysis", In Publication of APA Handbook of Research Methods in Psychology, vol. 2: Research Designs: Quantitative, Qualitative, Neuropsychological, and Biological, 2012, pp. 57-71.
Broman, et al., "Data Organization in Spreadsheets", In Journal of the American Statistician, vol. 72, Issue 1, Apr. 24, 2018, pp. 2-10.
Brown, et al., "Novice Java Programming Mistakes: Large-Scale Data vs. Educator Beliefs", In Journal of ACM Transactions on Computing Education (TOCE), vol. 17, Issue 2, May 3, 2017, 22 Pages.
Burnett, et al., "Forms/3: a first-order visual language to explore the boundaries of the spreadsheet paradigm", In the Journal of Functional Programming, vol. 11, No. 2, Mar. 2001, pp. 155-206.
Burnett, et al., "Visually Customizing Inference Rules About Apples and Oranges", In Proceedings IEEE Symposia on Human Centric Computing Languages and Environments, Sep. 3, 2002, 9 Pages.
Chambers, et al., "Struggling to Excel: a Field Study of Challenges Faced by Spreadsheet Users", In Proceedings of the IEEE Symposium on Visual Languages and Human-Centric Computing, Sep. 21, 2010, 8 Pages.

(56) References Cited

OTHER PUBLICATIONS

Chang, et al., "Using and Exploring Hierarchical Data in Spreadsheets", In Proceedings of CHI Conference on Human Factors in Computing Systems, May 7, 2016, pp. 2497-2507.

Charmaz, Kathy, "Constructing Grounded Theory: a Practical Guide through Qualitative Analysis", Published by SAGE Publications Ltd, London, Jan. 27, 2006, 224 Pages.

Cheng, et al., "Static analysis of spreadsheet applications for type-unsafe operations detection", In Proceedings of European Symposium on Programming Languages and Systems, Apr. 11, 2015, pp. 26-52.

Convertino, et al., "Self-Service Data Preparation and Analysis by Business Users: New Needs, Skills, and Tools", In Proceedings of the CHI Conference Extended Abstracts on Human Factors in Computing Systems, May 6, 2017, pp. 1075-1083.

Corbin, et al., "Basics of Qualitative Research: Techniques and Procedures for Developing Grounded Theory", In Publication of SAGE, 2008, 404 Pages.

Coyle, et al., "I Did that! Measuring Users' Experience of Agency in Their Own Actions", In Proceedings of the SIGCHI Conference on Human Factors in Computing Systems, May 5, 2012, pp. 2025-2034.

Cunha, et al., "Embedding and Evolution of Spreadsheet Models in Spreadsheet Systems", In Proceedings of the IEEE Symposium on Visual Languages and Human-Centric Computing (VL/HCC), Sep. 18, 2011, pp. 179-186.

Czerwinski, et al., "Subjective Duration Assessment: an Implicit Probe for Software Usability", In Proceedings of the IHM-HCI Conference, vol. 2, Sep. 2001, 4 Pages.

Davies, et al., "'There's No Such Thing as Raw Data': Exploring the Socio-Technical Life of a Government Dataset", In Proceedings of the 5th Annual ACM Web Science Conference, May 2, 2013, pp. 75-78.

Dell, et al., ""Yours is Better!": Participant Response Bias in HCI", In Proceedings of the SIGCHI Conference on Human Factors in Computing Systems, May 5, 2012, pp. 1321-1330.

Djang, et al., "Similarity inheritance: a new model of inheritance for spreadsheet VPLS", In Proceedings of IEEE Symposium on Visual Languages, Sep. 1, 1998, 8 Pages.

Dobell, et al., "Spreadsheet Error Types and Their Prevalence in a Healthcare Context", In Journal of Organizational and End User Computing (JOEUC), vol. 30, Issue 2, Article 2, Apr. 1, 2018, pp. 20-42.

Dreyfus, et al., "A Five-Stage Model of the Mental Activities Involved in Directed Skill Acquisition", In Technical Report of California University Berkeley Operations Research Center, Feb. 1, 1980, 22 Pages.

Engels, et al., "ClassSheets: Automatic Generation of Spreadsheet Applications from Object-Oriented Specifications", In Proceedings of the 20th IEEE/ACM international Conference on Automated Software Engineering, Nov. 7, 2005, pp. 124-133.

Erete, et al., "Storytelling with Data: Examining the Use of Data by Non-Profit Organizations", In Proceedings of the 19th ACM Conference on Computer-Supported Cooperative Work & Social Computing, Feb. 27, 2016, pp. 1273-1283.

Erwig, et al., "Gencel: a Program Generator for Correct Spreadsheets", In Journal of Functional Programming, vol. 16, Issue 3, May 2006, pp. 293-325.

Esposito, Emily, "Low-Fidelity vs. High-Fidelity Prototyping", Retrieved From : https://www.invisionapp.com/inside-design/low-fi-vs-hi-fi-prototyping/, May 29, 2018, 10 Pages.

Fielding, Nigel G. , "Self-Report Study", In Book of The SAGE Dictionary of Social Research Methods, 2006, pp. 275-277.

Fowler, et al., "Refactoring: improving the design of existing code", In Publication of Addison-Wesley Professional, Jul. 8, 1999, 337 Pages.

Green, et al., "Comprehensibility of Visual and Textual Programs: a Test of Superlativism Against The'match-Mismatch'conjecture", In Publication of Open University, Computer Assisted Learning Research Group, Dec. 1991, 15 Pages.

Green, et al., "Usability Analysis of Visual Programming Environments: A 'Cognitive Dimensions' Framework", In Journal of Journal of Visual Languages & Computing vol. 7, Issue 2, Jun. 1, 1996, pp. 131-174.

Guest, et al., "How Many Interviews are Enough? an Experiment with Data Saturation and Variability", In Journal of Field Methods, vol. 18, Issue 1, Feb. 1, 2006, pp. 59-82.

Hall, et al., "Structuring Spreadsheets with the "Lish" Data Model", In Repository of arXiv:1801.08603v1, Jan. 25, 2018, 13 Pages.

Handel, et al., "What do People do at Work?", In Journal of Labour Market Research, vol. 49, Issue 2, Oct. 4, 2016, pp. 177-197.

Hassenzahl, et al., "User Experience—A Research Agenda", In Journal of Behaviour & Information Technology, vol. 25, Issue 2, Mar. 1, 2006, pp. 91-97.

Chalhoub, et al., ""It's Freedom to Put Things Where My MindWants": Understanding and Improving the User Experience of Structuring Data in Spreadsheets", In Proceedings of CHI Conference on Human Factors in Computing Systems, Apr. 29, 2022, 24 Pages.

Hendry, et al., "Creating, comprehending and explaining spreadsheets: a cognitive interpretation of what discretionary users think of the spreadsheet model", In International Journal of Human Computer Studies vol. 40, No. 6, Jun. 1, 1994, pp. 1033-1065.

Zhang, et al., "How do Data Science Workers Collaborate? Roles, Workflows, and Tools", In Proceedings of the ACM on Human-Computer Interaction, vol. 4, May 28, 2020, 23 Pages.

Seale, et al., "Quality in Qualitative Research", In Journal of Qualitative Inquiry, vol. 5, Issue 4, Dec. 1999, pp. 465-478.

Sestoft, et al., "Sheet-Defined Functions: Implementation and Initial Evaluation", In Proceeding of 4th International Symposium End-User Development, Jun. 10, 2013., pp. 88-103.

Sharma, Aditya, "Conditional Formatting in Spreadsheets", Retrieved From : https://www.datacamp.com/tutorial/conditional-formatting-in-spreadsheets, May 7, 2019, 12 Pages.

Shneiderman, et al., "Direct Manipulation: a Step Beyond Programming Languages", In Proceedings of Sparks of Innovation in Human-Computer Interaction, Aug. 1, 1983, 13 Pages.

Singh, et al., "Melford: Using Neural Networks to Find Spreadsheet Errors", In Microsoft Technical Report of MSR-TR-2017-5, Jan. 31, 2017, pp. 1-13.

Smith, et al., "Spreadsheet Practices and Challenges in a Large Multinational Conglomerate", In Proceedings of the IEEE Symposium on Visual Languages and Human-Centric Computing (VL/HCC), Oct. 11, 2017, 10 Pages.

Teixeira, et al., "On the Emergence of Patterns for Spreadsheets Data Arrangements", In Proceedings of the Federation of International Conferences on Software Technologies: Applications and Foundations, Jul. 4, 2016, pp. 333-345.

Trueman, CN, "Structured Interviews", Retrieved From : https://www.historylearningsite.co.uk/sociology/research-methods-in-sociology/structured-interviews/, May 22, 2015, 6 Pages.

Vaismoradi, et al., "Content Analysis and Thematic Analysis: Implications for Conducting a Qualitative Descriptive Study", In Journal of Nursing & Health Sciences, vol. 15, Issue 3, Mar. 11, 2013, pp. 398-405.

Wakeling, David, "Spreadsheet Functional Programming", In Journal of Functional Programming, vol. 17, Issue 1, Jan. 1, 2007, pp. 131-143.

Wallace, et al., "A Design-Led Inquiry into Personhood in Dementia", In Proceedings of the SIGCHI conference on human factors in computing systems, Apr. 27, 2013, 10 Pages.

Wilkinson, et al., "Using Research Instruments: a Guide for Researchers", In Publication of RoutledgeFalmer, Dec. 8, 2003, 190 Pages.

Williams, et al., "Higher-Order Spreadsheets with Spilled Arrays", In Proceedings of European Symposium on Programming, Apr. 27, 2020, pp. 743-769.

Williams, et al., "Understanding and Inferring Units in Spreadsheets", In Proceedings of IEEE Symposium on Visual Languages and Human-Centric Computing (VL/HCC), Aug. 1, 2020, 9 Pages.

Wilson, et al., "Harnessing Curiosity to Increase Correctness in End-User Programming", In Proceedings of the SIGCHI Conference on Human Factors in Computing Systems, Apr. 5, 2003, 8 Pages.

(56) References Cited

OTHER PUBLICATIONS

Zhang, et al., "Automated Refactoring of Nested-IF Formulae in Spreadsheets", In Proceedings of the 26th ACM Joint Meeting on European Software Engineering Conference and Symposium on the Foundations of Software Engineering, Nov. 4, 2018, 6 Pages.
"International Search Report and Written Opinion Issued in PCT Application No. PCT/US23/015048", Mailed Date: Jun. 20, 2023, 9 Pages.
Advait Sarkar, "The impact of syntax colouring on program comprehension", Proceedings of the 26th Annual Conference of the Psychology of Programming Interest Group—PPIG, 2015, pp. 49-58.
Alan Kay, "Computer Software", Scientific American—a division of Nature America, Inc, vol. 251, Issue. 3, Retrieved from internet URL: https://www.jstor.org/stable/24920344, Sep. 1984, 9 pages.
Borghouts, et al., "End-User Probabilistic Programming", Quantitative Evaluation of Systems, Sep. 4, 2019, pp. 1-23.
Borghouts, et al., "Somewhere Around That No. An Interview Study of How Spreadsheet Users Manage Uncertainty", arXiv preprint arXiv: 1905.13072, 2019, 30 pages.
Jacovi, et al., "Formalizing Trust in Artificial Intelligence: Prerequisites, Causes and Goals of Human Trust in AI", Proceedings of the 2021 ACM Conference on Fairness, Accountability, and Transparency, Jan. 20, 2021, 12 pages.
Lau, et al., "TweakIt: Supporting End-User Programmers Who Transmogrify Code", Proceedings of the 2021 CHI Conference on Human Factors in Computing Systems, May 7, 2021, pp. 1-12.
Ribeiro, et al., "Why Should I Trust You?": Explaining the Predictions of Any Classifier, Proceedings of the 22nd ACM SIGKDD International Conference on Knowledge Discovery and Data Mining, Aug. 13, 2016, pp. 1135-1144.

\* cited by examiner

| | A | B | C | D | E | F | G | H |
|---|---|---|---|---|---|---|---|---|
| 1 | | | Video Metadata | | | | Statistics | |
| 2 | Rank | Video name | Uploader | Upload date | Genre | Views (BN) | Likes (MM) | Dislikes (MM) |
| 3 | 1 | Despacito | Luis Fonsi | 12-Jan-17 | Pop | 7.46 | 34.87 | 7.89 |
| 4 | 2 | Shape of You | Ed Sheeran | 30-Jan-17 | Pop | 5.4 | 29.48 | 6.22 |
| 5 | 3 | See You Again | Wiz Khalifa | 6-Apr-15 | Pop | 5.19 | 27.44 | 5.76 |
| 6 | 4 | Uptown Funk | Mark Ronson | 19-Nov-14 | Electronic | 4.24 | 21.11 | 5.1 |
| 7 | 5 | Gangnam Style | Psy | 15-Jul-12 | Pop Rock | 4.13 | 21.09 | 4.82 |
| 8 | 6 | Sorry | Justin Bieber | 22-Oct-15 | Pop | 3.45 | | |
| 9 | 7 | Roar | Katy Perry | 5-Sep-13 | Pop | 3.39 | 18.6 | 3.95 |
| 10 | 8 | Thinking out loud | Ed Sheeran | 7-Oct-14 | Pop Punk | 3.29 | 18.45 | 3.79 |
| 11 | 9 | Dark Horse | Katy Perry | 20-Feb-14 | Electronic | 3.11 | 17.89 | 3.34 |
| 12 | 10 | Faded | Alan Walker | 3-Dec-15 | Electronic | 3.1 | 17.25 | 3.29 |
| 13 | 11 | Girlfriend | Avril Lavigne | 27-Feb-07 | Pop Punk | 1.5 | 10.32 | 1.23 |
| 14 | 12 | Not Afraid | Eminem | 27-Aug-12 | Rap | 1.45 | 8.45 | 4.3 |
| 15 | 13 | Thrift Shop | Mackelmore | 14-Oct-12 | Rap | 1.34 | 7.43 | 2.3 |
| 16 | 14 | Hotline Bling | Drake | 31-Jul-15 | Rap | 1.23 | 4.32 | 4.5 |

FIGURE 10A

| | A | B | C | D | E | F | G | H | I | J |
|---|---|---|---|---|---|---|---|---|---|---|
| 1 | | | Video Metadata | | | | Statistics | | | |
| 2 | Rank | Video name | Uploader | Upload date | Genre | Views (BN) | Likes (MM) | Dislikes (MM) | | |
| 3 | 1 | Despacito | Luis Fonsi | 12-Jan-17 | Pop | 7.46 | 34.87 | 7.89 | | |
| 4 | 2 | Shape of You | Ed Sheeran | 30-Jan-17 | Pop | 5.4 | 29.48 | 6.22 | | |
| 5 | 3 | See You Again | Wiz Khalifa | 6-Apr-15 | Pop | 5.19 | 27.44 | 5.76 | | |
| 6 | 4 | Uptown Funk | Mark Ronson | 19-Nov-14 | Electronic | 4.24 | 21.11 | 5.1 | | |
| 7 | 5 | Gangnam Style | Psy | 15-Jul-12 | Pop Rock | 4.13 | 21.09 | 4.82 | | |
| 8 | 6 | Sorry | Justin Bieber | 22-Oct-15 | Pop | 3.45 | | | | |
| 9 | 7 | Roar | Katy Perry | 5-Sep-13 | Pop | 3.39 | 18.6 | 3.95 | | |
| 10 | 8 | Thinking out loud | Ed Sheeran | 7-Oct-14 | Pop Punk | 3.29 | 18.45 | 3.79 | | |
| 11 | 9 | Dark Horse | Katy Perry | 20-Feb-14 | Electronic | 3.11 | 17.89 | 3.34 | | |
| 12 | 10 | Faded | Alan Walker | 3-Dec-15 | Electronic | 3.1 | 17.25 | 3.29 | | |
| 13 | 11 | Girlfriend | Avril Lavigne | 27-Feb-07 | Pop Punk | 1.5 | 10.32 | 1.23 | | |
| 14 | 12 | Not Afraid | Eminem | 27-Aug-12 | Rap | 1.45 | 8.45 | 4.3 | | |
| 15 | 13 | Thrift Shop | Macklemore | 14-Oct-12 | Rap | 1.34 | 7.43 | 2.3 | | |
| 16 | 14 | Hotline Bling | Drake | 31-Jul-15 | Rap | 1.23 | 4.32 | 4.5 | | |

FIGURE 10D

| | A | B | C | D | E | F | G | H | I |
|---|---|---|---|---|---|---|---|---|---|
| 1 | | Video Metadata | | | | | Statistics | | |
| 2 | Rank | Video name | Uploader | Upload date | Genre | Views (BN) | Likes (MM) | Dislikes (MM) | Total Vo |
| 3 | 1 | Despacito | Luis Fonsi | 12-Jan-17 | Pop | 7.46 | 34.87 | 7.89 | |
| 4 | 2 | Shape of You | Ed Sheeran | 30-Jan-17 | Pop | 5.4 | 29.48 | 6.22 | |
| 5 | 3 | See You Again | Wiz Khalifa | 6-Apr-15 | Pop | 5.19 | 27.44 | 5.76 | |
| 6 | 4 | Uptown Funk | Mark Ronson | 19-Nov-14 | Electronic | 4.24 | 21.11 | 5.1 | |
| 7 | 5 | Gangnam Style | Psy | 15-Jul-12 | Pop Rock | 4.13 | 21.09 | 4.82 | |
| 8 | 6 | Sorry | Justin Bieber | 22-Oct-15 | Pop | 3.45 | | | |
| 9 | 7 | Roar | Katy Perry | 5-Sep-13 | Pop | 3.39 | 18.6 | 3.95 | |
| 10 | 8 | Thinking out loud | Ed Sheeran | 7-Oct-14 | Pop Punk | 3.29 | 18.45 | 3.79 | |
| 11 | 9 | Dark Horse | Katy Perry | 20-Feb-14 | Electronic | 3.11 | 17.89 | 3.34 | |
| 12 | 10 | Faded | Alan Walker | 3-Dec-15 | Electronic | 3.1 | 17.25 | 3.29 | |
| 13 | 11 | Girlfriend | Avril Lavigne | 27-Feb-07 | Pop Punk | 1.5 | 10.32 | 1.23 | |
| 14 | 12 | Not Afraid | Eminem | 27-Aug-12 | Rap | 1.45 | 8.45 | 4.3 | |
| 15 | 13 | Thrift Shop | Macklemore | 14-Oct-12 | Rap | 1.34 | 7.43 | 2.3 | |
| 16 | 14 | Hotline Bling | Drake | 31-Jul-15 | Rap | 1.23 | 4.32 | 4.5 | |
| 17 | | | | | | | | | |
| 18 | | | | | | | | | |
| 19 | | | | | | | | | |
| 20 | | | | | | | | | |

FIGURE 12A

| Excel | | | | | | | | | | |
|---|---|---|---|---|---|---|---|---|---|---|
| File | Home | Insert | Formulas | Data | Review | View | Automate | Help | | |

| A1 | ∨ | $f_x$ | | | | | | | | |
|---|---|---|---|---|---|---|---|---|---|---|
| | A | B | C | D | E | F | G | H | I | J |
| 1 | | | Video Metadata | | | | Statistics | | | |
| 2 | Rank | Video name | Uploader | Upload date | Genre | Views (BN) | Likes (MM) | Dislikes (MM) | Total Vo | |
| 3 | 1 | Despacito | Luis Fonsi | 12-Jan-17 | Pop | 7.46 | 3 | 3.95 | | |
| 4 | 2 | Shape of You | Ed Sheeran | 30-Jan-17 | Pop | 5.4 | 2 | 3.79 | | |
| 5 | 3 | See You Again | Wiz Khalifa | 6-Apr-15 | Pop | 5.19 | 2 | 3.34 | | |
| 6 | 4 | Uptown Funk | Mark Ronson | 19-Nov-14 | Electronic | 4.24 | 2 | 3.29 | | |
| 7 | 5 | Gangnam Style | Psy | 15-Jul-12 | Pop Rock | 4.13 | 2 | | | |
| 8 | 6 | Sorry | Justin Bieber | 22-Oct-15 | Pop | 3.45 | | | | |
| 9 | 7 | Roar | Katy Perry | 5-Sep-13 | Pop | 3.39 | 18.6 | | | |
| 10 | 8 | Thinking out loud | Ed Sheeran | 7-Oct-14 | Pop Punk | 3.29 | 18.45 | | | |
| 11 | 9 | Dark Horse | Katy Perry | 20-Feb-14 | Electronic | 3.11 | 17.89 | | | |
| 12 | 10 | Faded | Alan Walker | 3-Dec-15 | Electronic | 3.1 | 17.25 | | | |
| 13 | 11 | Girlfriend | Avril Lavigne | 27-Feb-07 | Pop Punk | 1.5 | 10.32 | 1.23 | | |
| 14 | 12 | Not Afraid | Eminem | 27-Aug-12 | Rap | 1.45 | 8.45 | 4.3 | | |
| 15 | 13 | Thrift Shop | Macklemore | 14-Oct-12 | Rap | 1.34 | 7.43 | 2.3 | | |
| 16 | 14 | Hotline Bling | Drake | 31-Jul-15 | Rap | 1.23 | 4.32 | 4.5 | | |

Suggested formulas
$f_x$ SUM
ⓘ Learn more

| | A | B | C | D | E | F | G | H | I | J |
|---|---|---|---|---|---|---|---|---|---|---|
| 1 | | Video Metadata | | | | | | Statistics | | |
| 2 | Rank | Video name | Uploader | Upload date | Genre | Views [BN] | Likes [MM] | Dislikes [MM] | Total Votes [MM] | |
| 3 | 1 | Despacito | Luis Fonsi | 12-Jan-17 | Pop | 7.46 | 34.87 | 7.89 | 42.76 | |
| 4 | 2 | Shape of You | Ed Sheeran | 30-Jan-17 | Pop | 5.4 | 29.48 | 6.22 | 35.7 | |
| 5 | 3 | See You Again | Wiz Khalifa | 6-Apr-15 | Pop | 5.19 | 27.44 | 5.76 | 33.2 | |
| 6 | 4 | Uptown Funk | Mark Ronson | 19-Nov-14 | Electronic | 4.24 | 21.11 | 5.1 | 26.21 | |
| 7 | 5 | Gangnam Style | Psy | 15-Jul-12 | Pop Rock | 4.13 | 21.09 | 4.82 | 25.91 | |
| 8 | 6 | Sorry | Justin Bieber | 22-Oct-15 | Pop | 3.45 | | | 0 | |
| 9 | 7 | Roar | Katy Perry | 5-Sep-13 | Pop | 3.39 | 18.6 | 3.95 | 22.55 | |
| 10 | 8 | Thinking out loud | Ed Sheeran | 7-Oct-14 | Pop Punk | 3.29 | 18.45 | 3.79 | 22.24 | |
| 11 | 9 | Dark Horse | Katy Perry | 20-Feb-14 | Electronic | 3.11 | 17.89 | 3.34 | 21.23 | |
| 12 | 10 | Faded | Alan Walker | 3-Dec-15 | Electronic | 3.1 | 17.25 | 3.29 | 20.54 | |
| 13 | 11 | Girlfriend | Avril Lavigne | 27-Feb-07 | Pop Punk | 1.5 | 10.32 | 1.23 | 11.55 | |
| 14 | 12 | Not Afraid | Eminem | 27-Aug-12 | Rap | 1.45 | 8.45 | 4.3 | 12.75 | |
| 15 | 13 | Thrift Shop | Macklemore | 14-Oct-12 | Rap | 1.34 | 7.43 | 2.3 | 9.73 | |
| 16 | 14 | Hotline Bling | Drake | 31-Jul-15 | Rap | 1.23 | 4.32 | 4.5 | 8.82 | |

FIGURE 12D

| | A | B | C | D | E | F | G | H | I |
|---|---|---|---|---|---|---|---|---|---|
| 1 | | | Video Metadata | | | | | Statistics | |
| 2 | Rank | Video name | Uploader | Upload date | Genre | Views (BN) | Likes (MM) | Dislikes (MM) | Total Votes (MM) |
| 3 | 1 | Despacito | Luis Fonsi | 12-Jan-17 | Pop | 7.46 | 34.87 | 7.89 | 42.76 |
| 4 | 2 | Shape of You | Ed Sheeran | 30-Jan-17 | Pop | 5.4 | 29.48 | 6.22 | 35.7 |
| 5 | 3 | See You Again | Wiz Khalifa | 6-Apr-15 | Pop | 5.19 | 27.44 | 5.76 | 33.2 |
| 6 | 4 | Uptown Funk | Mark Ronson | 19-Nov-14 | Electronic | 4.24 | 21.11 | 5.1 | 26.21 |
| 7 | 5 | Gangnam Style | Psy | 15-Jul-12 | Pop Rock | 4.13 | 21.09 | 4.82 | 25.91 |
| 8 | 6 | Sorry | Justin Bieber | 22-Oct-15 | Pop | 3.45 | | | 0 |
| 9 | 7 | Roar | Katy Perry | 5-Sep-13 | Pop | 3.39 | 18.6 | 3.95 | 22.55 |
| 10 | 8 | Thinking out loud | Ed Sheeran | 7-Oct-14 | Pop Punk | 3.29 | 18.45 | 3.79 | 22.24 |
| 11 | 9 | Dark Horse | Katy Perry | 20-Feb-14 | Electronic | 3.11 | 17.89 | 3.34 | 21.23 |
| 12 | 10 | Faded | Alan Walker | 3-Dec-15 | Electronic | 3.1 | 17.25 | 3.29 | 20.54 |
| 13 | 11 | Girlfriend | Avril Lavigne | 27-Feb-07 | Pop Punk | 1.5 | 10.32 | 1.23 | 11.55 |
| 14 | 12 | Not Afraid | Eminem | 27-Aug-12 | Rap | 1.45 | 8.45 | 4.3 | 12.75 |
| 15 | 13 | Thrift Shop | Macklemore | 14-Oct-12 | Rap | 1.34 | 7.43 | 2.3 | 9.73 |
| 16 | 14 | Hotline Bling | Drake | 31-Jul-15 | Rap | 1.23 | 4.32 | 4.5 | 8.82 |

FIGURE 13D

| | A | B | C | D | E | F | G | H | I |
|---|---|---|---|---|---|---|---|---|---|
| 1 | | | Video Metadata | | | | | Statistics | |
| 2 | Rank | Video name | Uploader | Upload date | Genre | Views (BN) | Likes (MM) | Dislikes (MM) | Total Votes (MM) |
| 3 | 1 | Despacito | Luis Fonsi | 12-Jan-17 | Pop | 7.46 | 34.87 | 7.89 | 42.76 |
| 4 | 2 | Shape of You | Ed Sheeran | 30-Jan-17 | Pop | 5.4 | 29.48 | 6.22 | 35.7 |
| 5 | 3 | See You Again | Wiz Khalifa | 6-Apr-15 | Pop | 5.19 | 27.44 | 5.76 | 33.2 |
| 6 | 4 | Uptown Funk | Mark Ronson | 19-Nov-14 | Electronic | 4.24 | 21.11 | 5.1 | 26.21 |
| 7 | 5 | Gangnam Style | Psy | 15-Jul-12 | Pop Rock | 4.13 | 21.09 | 4.82 | 25.91 |
| 8 | 6 | Sorry | Justin Bieber | 22-Oct-15 | Pop | 3.45 | | | 0 |
| 9 | 7 | Roar | Katy Perry | 5-Sep-13 | Pop | 3.39 | 18.6 | 3.95 | 22.55 |
| 10 | 8 | Thinking out loud | Ed Sheeran | 7-Oct-14 | Pop Punk | 3.29 | 18.45 | 3.79 | 22.24 |
| 11 | 9 | Dark Horse | Katy Perry | 20-Feb-14 | Electronic | 3.11 | 17.89 | 3.34 | 21.23 |
| 12 | 10 | Faded | Alan Walker | 3-Dec-15 | Electronic | 3.1 | 17.25 | 3.29 | 20.54 |
| 13 | 11 | Girlfriend | Avril Lavigne | 27-Feb-07 | Pop Punk | 1.5 | 10.32 | 1.23 | 11.55 |
| 14 | 12 | Not Afraid | Eminem | 27-Aug-12 | Rap | 1.45 | 8.45 | 4.3 | 12.75 |
| 15 | 13 | Thrift Shop | Macklemore | 14-Oct-12 | Rap | 1.34 | 7.43 | 2.3 | 9.73 |
| 16 | 14 | Hotline Bling | Drake | 31-Jul-15 | Rap | 1.23 | 4.32 | 4.5 | 8.82 |

| | A | B | C | D | E | F | G | H | I |
|---|---|---|---|---|---|---|---|---|---|
| 1 | | | Video Metadata | | | | | Statistics | |
| 2 | Rank | Video name | Uploader | Upload date | Genre | Views (BN) | Likes (MM) | Dislikes (MM) | Total Votes (MM) |
| 3 | 1 | Despacito | Luis Fonsi | 12-Jan-17 | Pop | 7.46 | 34.87 | 7.89 | 42.76 |
| 4 | 2 | Shape of You | Ed Sheeran | 30-Jan-17 | Pop | 5.4 | 29.48 | 6.22 | 35.7 |
| 5 | 3 | See You Again | Wiz Khalifa | 6-Apr-15 | Pop | 5.19 | 27.44 | 5.76 | 33.2 |
| 6 | 4 | Uptown Funk | Mark Ronson | 19-Nov-14 | Electronic | 4.24 | 21.11 | 5.1 | 26.21 |
| 7 | 5 | Gangnam Style | Psy | 15-Jul-12 | Pop Rock | 4.13 | 21.09 | 4.82 | 25.91 |
| 8 | 6 | Sorry | Justin Bieber | 22-Oct-15 | Pop | 3.45 | | | 0 |
| 9 | 7 | Roar | Katy Perry | 5-Sep-13 | Pop | 3.39 | 18.6 | 3.95 | 22.55 |
| 10 | 8 | Thinking out loud | Ed Sheeran | 7-Oct-14 | Pop Punk | 3.29 | 18.45 | 3.79 | 22.24 |
| 11 | 9 | Dark Horse | Katy Perry | 20-Feb-14 | Electronic | 3.11 | 17.89 | 3.34 | 21.23 |
| 12 | 10 | Faded | Alan Walker | 3-Dec-15 | Electronic | 3.1 | 17.25 | 3.29 | 20.54 |
| 13 | 11 | Girlfriend | Avril Lavigne | 27-Feb-07 | Pop Punk | 1.5 | 10.32 | 1.23 | 11.55 |
| 14 | 12 | Not Afraid | Eminem | 27-Aug-12 | Rap | 1.45 | 8.45 | 4.3 | 12.75 |
| 15 | 13 | Thrift Shop | Macklemore | 14-Oct-12 | Rap | 1.34 | 7.43 | 2.3 | 9.73 |
| 16 | 14 | Hotline Bling | Drake | 31-Jul-15 | Rap | 1.23 | 4.32 | 4.5 | 8.82 |

| | A | B | C | D | E | F | G | H | I |
|---|---|---|---|---|---|---|---|---|---|
| 1 | | | Video Metadata | | | | | Statistics | |
| 2 | Rank | Video name | Uploader | Upload date | Genre | Views (BN) | Likes (MM) | Dislikes (MM) | Total Votes (MM) |
| 3 | 1 | Despacito | Luis Fonsi | 12-Jan-17 | Pop | 7.46 | 34.87 | Cut | 2.76 |
| 4 | 2 | Shape of You | Ed Sheeran | 30-Jan-17 | Pop | 5.4 | 29.48 | Copy | 35.7 |
| 5 | 3 | See You Again | Wiz Khalifa | 6-Apr-15 | Pop | 5.19 | 27.44 | Paste Options | 33.2 |
| 6 | 4 | Uptown Funk | Mark Ronson | 19-Nov-14 | Electronic | 4.24 | 21.11 | Insert | 5.21 |
| 7 | 5 | Gangnam Style | Psy | 15-Jul-12 | Pop Rock | 4.13 | 21.09 | Delete | 5.91 |
| 8 | 6 | Sorry | Justin Bieber | 22-Oct-15 | Pop | 3.45 | | Data Validation Suggestions | 0 |
| 9 | 7 | Roar | Katy Perry | 5-Sep-13 | Pop | 3.39 | 18.6 | New Comment | 2.55 |
| 10 | 8 | Thinking out loud | Ed Sheeran | 7-Oct-14 | Pop Punk | 3.29 | 18.45 | Number Format | 2.24 |
| 11 | 9 | Dark Horse | Katy Perry | 20-Feb-14 | Electronic | 3.11 | 17.89 | | 1.23 |
| 12 | 10 | Faded | Alan Walker | 3-Dec-15 | Electronic | 3.1 | 17.25 | 3.29 | 20.54 |
| 13 | 11 | Girlfriend | Avril Lavigne | 27-Feb-07 | Pop Punk | 1.5 | 10.32 | 1.23 | 11.55 |
| 14 | 12 | Not Afraid | Eminem | 27-Aug-12 | Rap | 1.45 | 8.45 | 4.3 | 12.75 |
| 15 | 13 | Thrift Shop | Macklemore | 14-Oct-12 | Rap | 1.34 | 7.43 | 2.3 | 9.73 |
| 16 | 14 | Hotline Bling | Drake | 31-Jul-15 | Rap | 1.23 | 4.32 | 4.5 | 8.82 |

| | A | B | C | D | E | F | G | H | I | J |
|---|---|---|---|---|---|---|---|---|---|---|
| 1 | | | Video Metadata | | | | | Statistics | | |
| 2 | Rank | Video name | Uploader | Upload date | Genre | Views (BN) | Likes (MM) | Dislikes (MM) | Total Votes (MM) | |
| 3 | 1 | Despacito | Luis Fonsi | 12-Jan-17 | Pop | 7.46 | 34.87 | 7.89 | 42.76 | |
| 4 | 2 | Shape of You | Ed Sheeran | 30-Jan-17 | Pop | 5.4 | 29.48 | 6.22 | 35.7 | |
| 5 | 3 | See You Again | Wiz Khalifa | 6-Apr-15 | Pop | 5.19 | 27.44 | 5.76 | 33.2 | |
| 6 | 4 | Uptown Funk | Mark Ronson | 19-Nov-14 | Electronic | 4.24 | 21.11 | 5.1 | 26.21 | |
| 7 | 5 | Gangnam Style | Psy | 15-Jul-12 | Pop Rock | 4.13 | 21.09 | 4.82 | 25.91 | |
| 8 | 6 | Sorry | Justin Bieber | 22-Oct-15 | Pop | 3.45 | | | 0 | |
| 9 | 7 | Roar | Katy Perry | 5-Sep-13 | Pop | 3.39 | 18.6 | 3.95 | 22.55 | |
| 10 | 8 | Thinking out loud | Ed Sheeran | 7-Oct-14 | Pop Punk | 3.29 | 18.45 | 3.79 | 22.24 | |
| 11 | 9 | Dark Horse | Katy Perry | 20-Feb-14 | Electronic | 3.11 | 17.89 | 3.34 | 21.23 | |
| 12 | 10 | Faded | Alan Walker | 3-Dec-15 | Electronic | 3.1 | 17.25 | 3.29 | 20.54 | |
| 13 | 11 | Girlfriend | Avril Lavigne | 27-Feb-07 | Pop Punk | 1.5 | 10.32 | 1.23 | 11.55 | |
| 14 | 12 | Not Afraid | Eminem | 27-Aug-12 | Rap | 1.45 | 8.45 | 4.3 | 12.75 | |
| 15 | 13 | Thrift Shop | Macklemore | 14-Oct-12 | Rap | 1.34 | 7.43 | 2.3 | 9.73 | |
| 16 | 14 | Hotline Bling | Drake | 31-Jul-15 | Rap | 1.23 | 4.32 | 4.5 | 8.82 | |

| | A | B | C | D | E | F | G | H | I | J |
|---|---|---|---|---|---|---|---|---|---|---|
| 1 | | | | Video Metadata | | | Statistics | | | |
| 2 | | Rank ▼ | Video name ▼ | Uploader ▼ | Upload date ▼ | Genre ▼ | Views (BN) ▼ | Likes (MM) ▼ | Dislikes (MM) ▼ | Total Votes (M |
| 3 | Electronic | | | | | | | | | |
| 4 | | 4 | Uptown Funk | Mark Ronson | 19-Nov-14 | Electronic | 4.24 | 21.11 | 5.1 | 26 |
| 5 | | 9 | Dark Horse | Katy Perry | 20-Feb-14 | Electronic | 3.11 | 17.89 | 3.34 | 21 |
| 6 | | 10 | Faded | Alan Walker | 3-Dec-15 | Electronic | 3.1 | 17.25 | 3.29 | 20 |
| 7 | Pop | | | | | | | | | |
| 8 | | 1 | Despacito | Luis Fonsi | 12-Jan-17 | Pop | 7.46 | 34.87 | 7.89 | 42 |
| 9 | | 2 | Shape of You | Ed Sheeran | 30-Jan-17 | Pop | 5.4 | 29.48 | 6.22 | 3 |
| 10 | | 6 | Sorry | Justin Bieber | 22-Oct-15 | Pop | 3.45 | | | |
| 11 | | 7 | Roar | Katy Perry | 5-Sep-13 | Pop | 3.39 | 18.6 | 3.95 | 22 |
| 12 | Pop Punk | | | | | | | | | |
| 13 | | 5 | Gangnam Style | Psy | 15-Jul-12 | Pop Rock | 4.13 | 21.09 | 4.82 | 25 |
| 14 | | 8 | Thinking out loud | Ed Sheeran | 7-Oct-14 | Pop Punk | 3.29 | 18.45 | 3.79 | 22 |
| 15 | | 11 | Girlfriend | Avril Lavigne | 27-Feb-07 | Pop Punk | 1.5 | 10.32 | 1.23 | 11 |
| 16 | Rap | | | | | | | | | |
| 17 | | 3 | See You Again | Wiz Khalifa | 6-Apr-15 | Pop | 5.19 | 27.44 | 5.76 | 3 |
| 18 | | 12 | Not Afraid | Eminem | 27-Aug-12 | Rap | 1.45 | 8.45 | 4.3 | 12 |
| 19 | | 13 | Thrift Shop | Macklemore | 14-Oct-12 | Rap | 1.34 | 7.43 | 2.3 | |
| 20 | | 14 | Hotline Bling | Drake | 31-Jul-15 | Rap | 1.23 | 4.32 | 4.5 | |

FIGURE 17C

TABLE COLUMN OPERATIONS FOR SPREADSHEETS

RELATED APPLICATIONS

This application claims the benefit of priority to U.S. Provisional Patent Application No. 63/328,625, filed on Apr. 7, 2022, and entitled ENHANCEMENTS TO SPREADSHEET TABLES, and which is hereby incorporated by reference in its entirety.

BACKGROUND

Spreadsheet users often employ higher-level abstractions, such as arrays and matrices, despite not having a formal understanding of such structures. Thus, there can be a mismatch between the conceptual level at which a user desires a spreadsheet to operate relative to the way in which the spreadsheet represents the data, resulting in errors. Previous attempts to solve such issues have relied on the imposition of significant restrictions on the freedom provided by the grid as well as increased complexity.

OVERVIEW

Various embodiments of the present technology generally relate to the use of table column metadata for enhanced spreadsheet table functionality. More specifically, embodiments of the present technology include systems and methods for incorporating various table column operations into table column headers, thereby simplifying the act of propagating a desired effect across a range that exactly matches the table column. In an embodiment of the present technology, a computing apparatus comprises one or more computer readable storage media, one or more processors operatively coupled with the one or more computer readable storage media, and program instructions stored on the one or more computer readable storage media.

The program instructions, when executed by the one or more processors, direct the computing apparatus to at least detect a cell event in a spreadsheet, wherein the cell event affects one or more cells of the spreadsheet and determine that a cell of the one or more cells is inside a range that makes up a table in the spreadsheet. The program instructions further direct the computing apparatus to identify a table column of the table to which the cell belongs, identify metadata for the table column comprising column configuration instructions, and apply the column configuration instructions to the cell.

This Overview is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIGS. 10A-10D illustrate an example of enhanced spreadsheet functionality in accordance with some embodiments of the present technology.

FIGS. 12A-12D illustrate an example of enhanced spreadsheet functionality in accordance with some embodiments of the present technology.

FIGS. 13A-13D illustrate an example of enhanced spreadsheet functionality in accordance with some embodiments of the present technology.

FIGS. 14A-14D illustrate an example of enhanced spreadsheet functionality in accordance with some embodiments of the present technology.

FIGS. 15A-15D illustrate an example of enhanced spreadsheet functionality in accordance with some embodiments of the present technology.

FIGS. 16A-16D illustrate an example of enhanced spreadsheet functionality in accordance with some embodiments of the present technology.

FIGS. 17A-17C illustrate an example of enhanced spreadsheet functionality in accordance with some embodiments of the present technology.

Figure 1A:
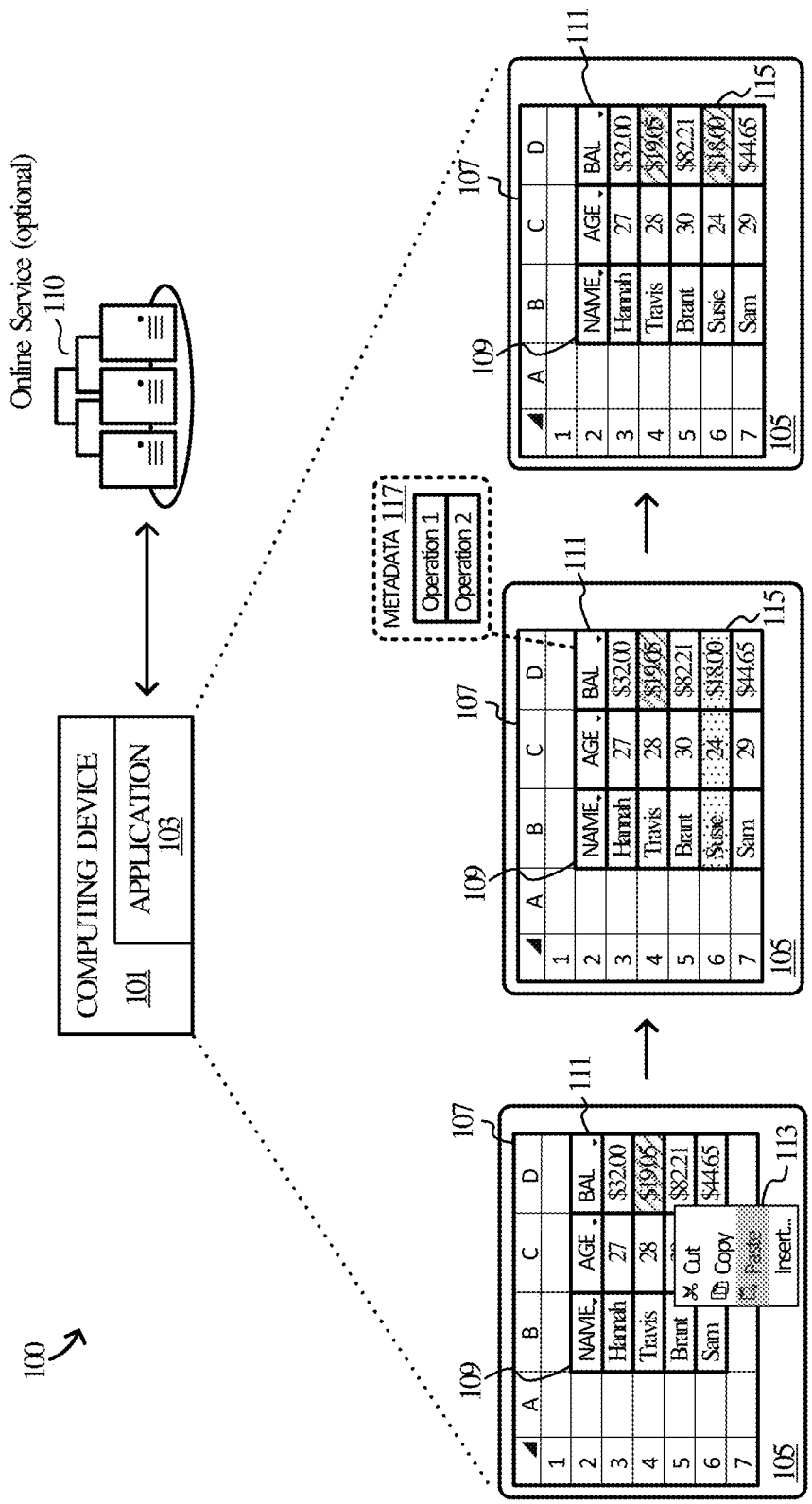
FIGS. 1A-1B illustrate an example of an enhanced spreadsheet environment in which some embodiments of the present technology may be implemented.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments of the present technology generally relate to enhancements to spreadsheet tables. More specifically, embodiments of the present technology include systems and methods for incorporating various table column operations into table column headers, thereby simplifying the act of propagating a desired effect across a range that exactly matches the table column.

Current spreadsheet tables are brittle to many operations, such as when the table grows, shrinks, columns are moved, or any similar event that triggers a recalculation or refresh of the spreadsheet. When a user performs these operations, the range associated with the table is often not updated properly upon such triggering event. This is due to the fact that there is a disconnect between the level the user is visually operating at (i.e., the "table level") and the level at which the spreadsheet metadata tools operate on the table.

Prior solutions have tried to solve this problem by providing arrays or records for the user to store their data in and then applying the operations to the arrays or records. However, many users prefer not to store their data in these ways for numerous reasons, including because these storage techniques are not flexible enough for their needs or because the user lacks the technical expertise to use them. Because of these barriers, prior solutions fall short of being useful to many spreadsheet application users. Therefore, the present solution enables the continued use of spreadsheet tables while also reducing the brittleness that users often experience when working with those tables.

Thus, the technology disclosed herein shifts the way metadata applies to spreadsheet tables by applying it to the data structures themselves, rather than to a range that correlates to a data structure. In other words, operations, including formulas and formatting, are applied to entire columns of spreadsheet tables, rather than to defined ranges. When an operation is invoked by a user, it is invoked as metadata on the column. Thus, when changes are made or a refresh is triggered, the engine may check for formatting instructions for the column at the table level, rather than checking metadata for individual cells. For example, when there are changes to a table, such as changes to the length of a column or a column gets moved around, previously defined rules for the table are automatically applied to the correct range—that is, the range that the user sees as the table. It is possible to automatically apply the rule to the correct range because the rule is not stored as a property of a range of cells, it is stored as a property of the table column.

A limited number of table-column operations exist already, such as sorting and filtering, which are applied on an entire column. To use these operations in certain embodiments, a user may go to the table header and apply the sort or the filter to the column. However, by storing metadata as a property of the table itself, additional operations can be provided in a manner that appears the same to the user. Such operations may include conditional formatting, data validation, access control, grouping, formulas, sorting, and the like. In accordance with the present technology, these operations can be integrated into the same paradigm as sorting and filtering when interacting with the table column.

Spreadsheet tables, in accordance with the present technology, may include both structured tables and unstructured tables. A structured table is one that has been explicitly identified as something that the user has an intent to format in a specific way. A structured table exists as a table object that is imposed on top of the grid. Alternatively, an unstructured table is entered directly into the grid, where little or no formatting has been applied by the user to formally create a table object. For example, an unstructured table may exist when tabular data gets dumped into the grid. In the case of an unstructured table, a form of artificial intelligence, such as machine learning methods, may be employed to detect that a table exists and determine its boundaries. Similar means may be employed to detect the columns of the table and what they represent.

In an embodiment, a computing apparatus comprises at least one computer readable storage medium, at least one processor operatively coupled with the one or more computer readable storage medium, and program instructions stored on the at least one computer readable storage medium The program instructions, when executed by the at least one processors, direct the computing apparatus to at least detect a cell event in a spreadsheet, wherein the cell event affects a cell of the spreadsheet, and determine that the cell is inside a range that makes up a table in the spreadsheet. The program instructions further direct the computing apparatus to identify a table column of the table to which the cell belongs, identify metadata for the table column, wherein the metadata for the table column comprises column configuration instructions, and apply the column configuration instructions to the cell. Column configuration instructions may include any of the table level functionality described in the implementations below, as well as additional table level functionality, including but not limited to conditional formatting, data validation, formula headers, access controls, group by category, auto-fill, and the like.

Various technical effects may be appreciated from the implementations disclosed herein, including creating a more user-friendly spreadsheet table by applying settings at the table level, rather than solely at the grid, cell, or cell-range level. Additionally, technical effects that may be appreciated from the implementations herein include a reduction in user error with spreadsheet tables, reduction in errors and breakages in spreadsheet table formatting, reduced need to fix errors and breakages, and reduced processing time. Other technical effects include improved functionality of spreadsheets, and additional functionality for spreadsheet tables, including but not limited to conditional formatting, data validation, column functions, group by category, access control, and the like. The implementations disclosed herein may also serve to bridge the disconnect between the conceptual level that a user of a spreadsheet table may operate on and the level that spreadsheet table functionality takes place.

Several implementations of the present technology are contemplated herein. However, the underlying technology is not limited to these implementations. In a first implementation, enhanced spreadsheet tables as described herein include column level conditional formatting. In many existing spreadsheet applications, a user can apply conditional formatting to an identified range of cells. In these cases, the workbook maintains a list of ranges on the sheet that have conditional formatting in them. When a cell in that range is recalculated, its conditional formatting is recalculated. Thus, using existing functionality, when a user wishes to apply conditional formatting to a table column, they can manually identify a range that corresponds to a table column at the time the range is identified, but the formatting is nonetheless applied to the range. Therefore, when changes are made to the table or the cells in the range, numerous issues can arise.

Problematically, there are various interaction patterns that can prevent a table column from corresponding exactly to a range to which the conditional formatting applies. For example, if a cell in a spreadsheet has its own formatting, and the user pastes that cell into a range that has conditional formatting, this, in effect, slices up the range and the pasted cell will lack the conditional formatting that has been previously applied to the column (i.e., the range corresponding to the column). Thus, if the user intended for the conditional formatting to be uniform throughout the entire column, this would no longer be the case.

Existing solutions for such conditional formatting issues have very specific structure requirements (e.g., column-wise typing) for the conditional formatting to work. These existing solutions nonetheless still rely on the name manager or the range specification and typically only work because they impose a forced structure on the data. Examples of such structure requirements include date, monetary value, number, and the like.

In accordance with the present technology, conditional formatting is applied to a table column as a column configuration instruction rather than to a range of individual cells. This is achieved by associating the metadata with the column of the table. In this case, the engine checking for conditional formatting instructions checks for instructions for the column at the table level, rather than checking metadata for the cell. Thus, to ensure uniformity among cells of the table, when an engine performs a recalculation or reformatting, it may check the metadata for the column, then identify the current range for column, and then perform calculations or applying formatting based on the identified current range.

In some examples, to apply conditional formatting to a column, the user selects the column header (or a button in the column header) to set up or change conditional formatting instructions for that column. In alternative examples, the user may select a cell in the column to set up or change conditional formatting settings for the column. In this example, the value of the cell (i.e., the content in the cell) may serve as a starting point for the conditional formatting instructions. For example, the user may select a cell whose value is "25." In response to selecting the cell, the user may be prompted to create a conditional formatting instruction for the cell, wherein a conditional formatting for the cell may include a formatting instruction to gray each cell in the column having a value greater than, equal to, or less than 25.

In another implementation, enhanced spreadsheet tables as described herein include data validation functionality. Data validation enables users to control what a user can enter into a cell. Data validation is a column configuration instruction that may be similarly applied to an entire column (or multiple columns) at the table level. In accordance with the present technology, data validation is stored as metadata associated with the column, rather than with individual cells. In an example, data validation may be used to detect when a cell in a column has formatting that does not match the formatting specified for the column and automatically change the cell's formatting to match the column formatting or notify a user of the discrepancy. Data validation may occur automatically upon creation of table-level instructions or may occur when a user has turned on a data validation setting. Data validation, in accordance with the present technology, can be entered into a table or column by clicking directly on cell values.

In another implementation, enhanced spreadsheet tables as described herein include column configuration instructions based on formula headers such that a user can easily apply formulas or functions to entire columns by directly inserting them into the header cell of a column. In this implementation, if a user wishes for a column to show the sum of values from the two prior columns, they may enter the formula (e.g., "column 2+column 3") directly into the column header, which causes the rest of the column to populate with the computed values based on the values in column 2 and column 2. This functionality enables table header formulas to interact with and leverage table column metadata when creating and applying the formula. For example, a table header formula may refer directly to another table column, by name or means, rather than referring to cells within the body of other columns.

In another implementation, enhanced spreadsheet tables as described herein include formula auto-fill functionality. Formula auto-fill is a column configuration that may infer formulas and interactively suggest to users working with tabular data to populate column values with a computed formula. In certain embodiments of formula auto-fill for enhanced spreadsheet tables, the application generates a suggestion for what formula to use for a table column and the user can either accept or reject the suggestion. A suggestion, in some scenarios, may be generated via one or more machine learning models that are trained to evaluate tabular data and identify suggestions that a user is likely to want. If the user accepts the suggestion, the column cells may be automatically populated with the values calculated via the formula. A key component of the formula auto-fill functionality is that the formula is associated with the table column and tracked in the table metadata. Thus, filling column cells with the computed values is achieved in a different way from existing technologies.

In another implementation, enhanced spreadsheet tables as described herein include group by category functionality. Group by category is a column configuration instruction that allows users to easily group rows by column entries by, in some instances, directly clicking on cell values, or, in other instances, selecting options at the column-header level. Group by category is a column operation that actually moves rows in the table around so that they are grouped by their respective categories. In some embodiments, the technology also automatically adds category headers into the date to delineate the groupings. The benefit of this technology over similar existing technology is that it is still applied as a column operation, thereby providing the same benefits as the previous implementations during refreshes, updates on recalculations, updates upon moving columns around, updates upon formatting changes, updates upon manual recalculations or refreshes, and the like. This functionality also adds additional features such as category sorting, category calculations, and nested grouping, which can be performed within individual groups within a column. Because grouping by category is performed at the table-level, it also provides users with the ability to undo previous groupings.

In another implementation, enhanced spreadsheet tables as described herein include access control functionality. Access control can be applied at the table or column level as a column configuration instruction. Access control in accordance with the present technology allows access (i.e., read, write, edit, copy, etc.) to be controlled for certain users. For example, access may be given to or taken away from certain users, or certain types of users, such that they do or do not have the power to edit a table column.

In another implementation, enhanced spreadsheet tables as described herein include enhanced filtering and sorting functionality, wherein the filtering and sorting can be automatically applied at the table or column level. As previously discussed, sorting and filtering already exist as "table operations" to some extent because they can be applied on an entire column of a structured table. To use these operations in certain embodiments, a user may go to the table header and apply the sort or the filter to the column. However, in accordance with the present technology, sorting and filtering operations are stored as column configuration instructions and may be applied automatically upon an update, refresh, or recalculation based on metadata stored for the column.

Figure 19:
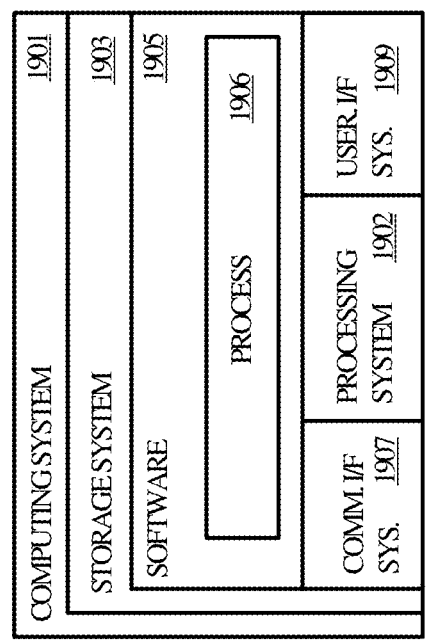
FIG. 19 illustrates an example of a computing device that may be used in accordance with some embodiments of the present technology.

Referring now to the drawings, FIG. 1A illustrates spreadsheet environment 100 in an implementation. Spreadsheet environment 100 includes computing device 101 with which a user may interact in the context of application 103 and its features and functionality. Examples of computing device 101 includes personal computers, tablet computers, mobile phones, and any other suitable devices, of which computing system 1901 in FIG. 19 is broadly representative.

Computing device 101 includes one or more software applications, of which application 103 is representative. Application 103 is representative of any software application in which a user can open and edit content such as spreadsheet workbooks, word processing documents, digital notebooks, slide presentations, emails, or the like. Examples of application 103 include, but are not limited to, spreadsheet applications, word processing applications, digital notebook applications, email applications, and workflow automation applications. Application 103 may be a natively installed and executed application, a browser-based application, a mobile application, or any other application suitable for experiencing spreadsheets, tables, and the like. Application 103 may execute in a stand-alone manner (as in the case of a natively installed application), within the context or another application (as in the case of a browser-based application), in an online collaborative context, in a combination of contexts, or in some other manner entirely.

Spreadsheet environment 100 may optionally include online service 110 in some implementations. Online service 110 may provide one or more computing services to end points such as computing device 101. For example, online service 110 may host all or portions of the workbook displayed in user interface 105, and all or portions of productivity applications. It may therefore be appreciated that some of the features and functionality attributed to application 103 on computing device 101 may be performed by online service 110 in some implementations. Online service 110 may provide a variety of other services including file storage, co-authoring and collaboration support, and the like. In some examples, online service 110 may provide a suite of applications and services with respect to a variety of computing workloads such as office productivity tasks, workflow automation tasks, email, chat, voice and video, and so on. Online service 110 employs one or more server computers co-located or distributed across one or more data centers connected to computing device 101. Examples of such servers include web servers, application servers, virtual or physical (bare metal) servers, or any combination or variation thereof, of which computing system 1901 in FIG. 19 is broadly representative. Computing device 101 may communicate with online service 110 via one or more internets and intranets, the Internet, wired and wireless networks, local area networks (LANs), wide area networks (WANs), and any other type of network or combination thereof.

Figure 2:
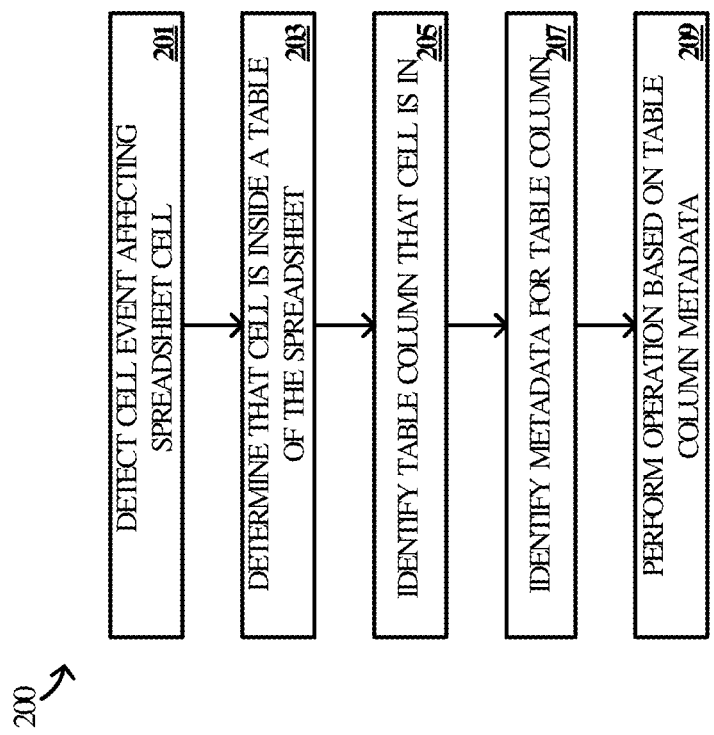
FIG. 2 illustrates a series of steps for applying enhanced spreadsheet table functionality in accordance with some embodiments of the present technology.

FIG. 2 illustrates process 200 for implementing enhanced spreadsheet tables as described herein. Process 200 may be implemented in program instructions in the context of any of the software applications, modules, components, or other such elements of one or more computing devices. For example, process 200 may be employed by an application on computing device 101 (e.g., application 103), or by an application running in the context of online service 110. The program instructions direct the one or more computing devices to operate as follows, referring to a computing device in the singular for purposes of clarity.

In step 201 of process 200, the computing device detects a cell event (e.g., paste operation 113) affecting one or more cells of a spreadsheet. In some examples, the cell event is an event that triggers recalculation of the spreadsheet, reformatting of the spreadsheet, a refresh of the spreadsheet, or similar automatic update. In step 203, the computing device determines that the one or more affected cells is inside a table of the spreadsheet (e.g., table 109), wherein the table may be a structured table or an unstructured table in some embodiments. In step 205, the computing device identifies one or more table columns that the one or more affected cells are in (e.g., column 111). In step 207, the computing device identifies metadata for each of the one or more identified table columns (e.g., metadata 117). In step 209, the spreadsheet application performs one or more operations (via the recalculation engine, formatting engine, refresh, or similar means of updating) based on the identified table column metadata, wherein the one or more operations consequently affect the one or more affected cells.

Figure 1B:
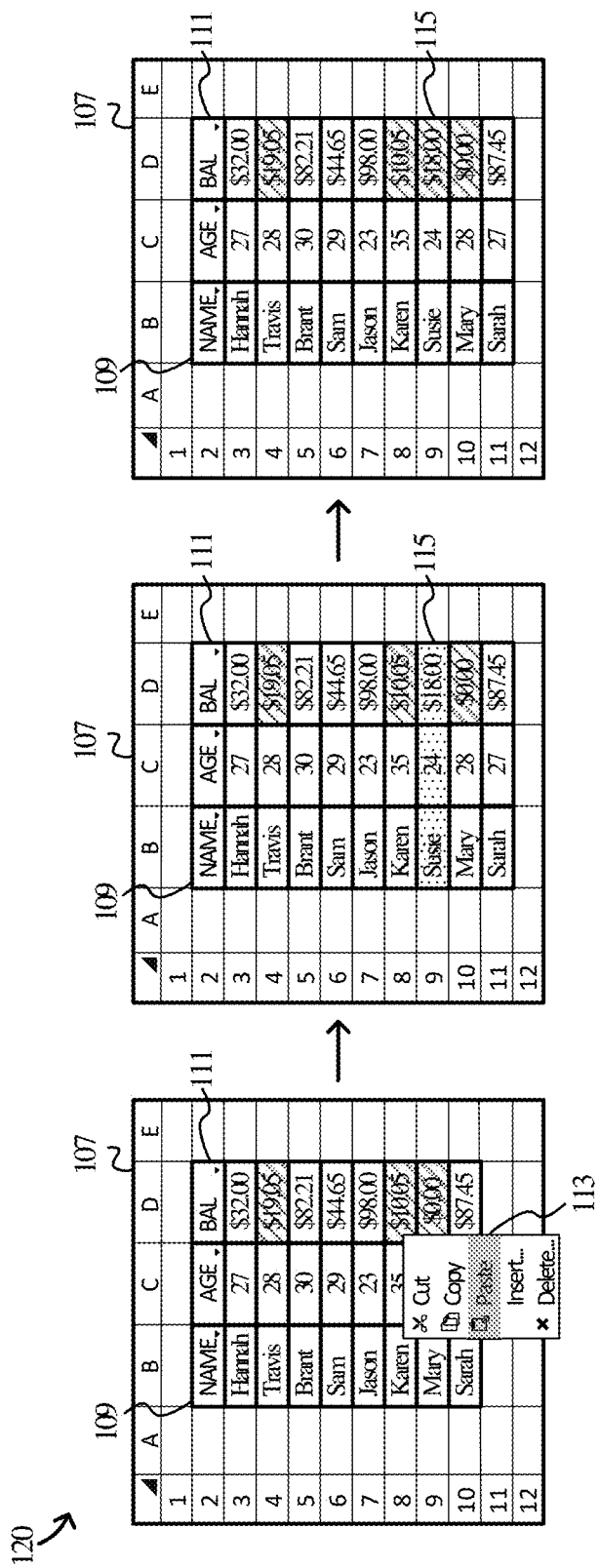

FIG. 1B illustrates an example user experience 120, demonstrating an application of process 200 with respect to spreadsheet environment 100. User experience 120 may serve as an example of process 200 as employed by the elements in spreadsheet environment 100. Enhanced spreadsheet environment comprises spreadsheet 107. Spreadsheet 107, as well as other spreadsheets depicted herein, is representative of any spreadsheet in a spreadsheet application (e.g., application 103), wherein the spreadsheet application may be a natively installed and executed application, a browser-based application, a mobile application, or any other application suitable for experiencing spreadsheets, tables, and the like. The spreadsheet application may execute in a stand-alone manner (as in the case of a natively installed application) or within the context of another application (as in the case of a browser-based application), or in some other manner entirely. The spreadsheet application is hosted by a computing device (e.g., computing device 101), wherein the computing device may include a personal computer, a tablet computer, a mobile phone, or any other suitable device for running a spreadsheet application. Spreadsheet 107 comprises table 109 having three columns: name, age, and balance, wherein the balance column is column 111.

Column 111 comprises conditional formatting settings that highlight cells having a balance of less than $20.00. In accordance with the present technology, the conditional formatting settings of column 111 are stored as metadata in association with column 111 of table 109, rather than being stored as metadata for the cells according to a specified range. Moving from left to right, in the first step shown, a user selects paste operation 113 from inside table 109. In response to a selection of the paste operation, row 115, a previously copied set of cells, is pasted into table 109, wherein the previously copied set of cells had either no previous conditional formatting applied or conditional formatting that differs from the conditional formatting of column 111. Upon row 115 being added to table 109, the conditional formatting of column 111 is automatically applied to the corresponding cell of row 115.

Figure 3:
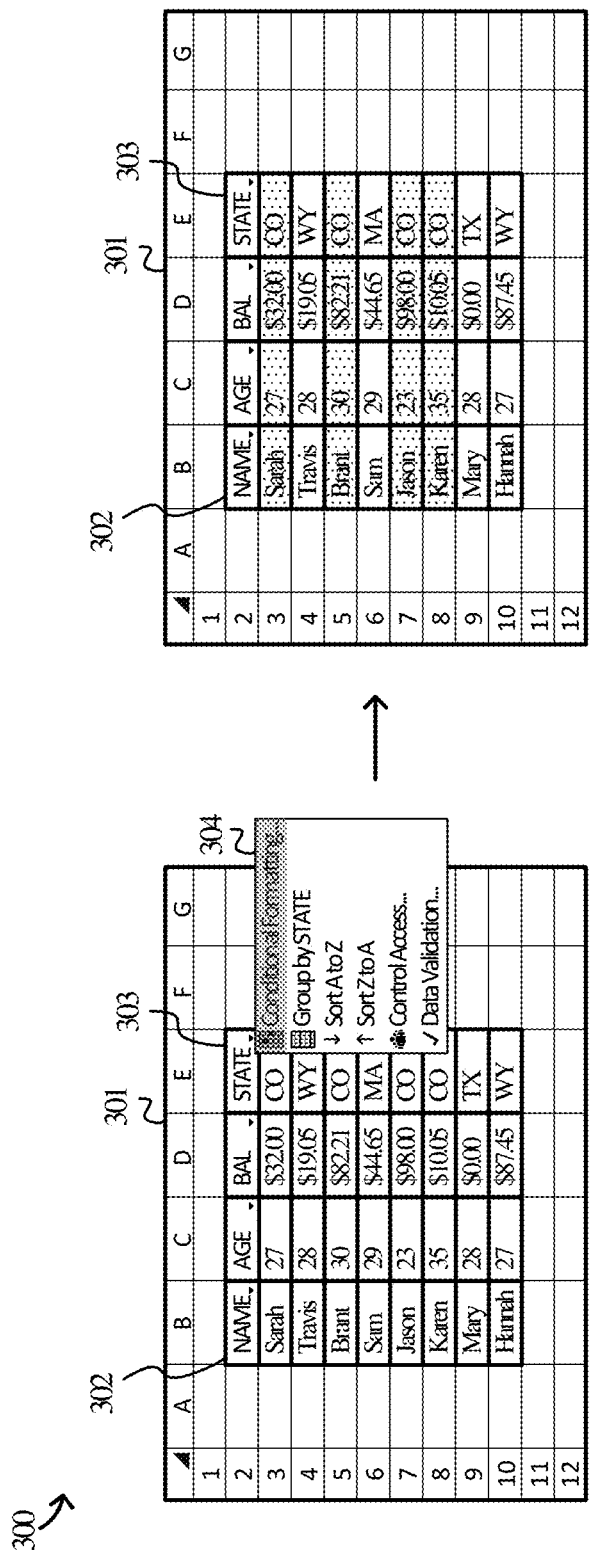
FIG. 3 illustrates an example of enhanced spreadsheet table functionality in accordance with some embodiments of the present technology.

FIG. 3 includes user experience 300, which illustrates two steps in accordance with enhanced spreadsheet table functionality as described herein. User experience 300 may be provided as the user interface of a spreadsheet application on computing device 101 (e.g., application 103), or by an application running in the context of online service 110. For example, user experience 300 may be employed by an application on computing device 101 (e.g., application 103), or by an application running in the context of online service 110.

User experience 300 comprises spreadsheet 301. Spreadsheet 301 comprises table 302. Table 302 has four columns: name, age, balance, and state, wherein the state column is column 303. In the first step shown in user experience 300, moving from left to right, conditional formatting option 304 is selected from the table column header cell. Upon selecting conditional formatting option 304, a user may be prompted to specify conditional formatting instructions for column 303. In the present example, the conditional formatting includes highlighting each entry having a state matching "CO." After specifying and applying these conditional formatting instructions, table 302 is formatted accordingly, such that each entry row having the state "CO" is highlighted. Applying such instructions may be performed upon recalculation of the spreadsheet or upon a similar refresh or update event, wherein the refresh or update event is triggered by the entrance of the conditional formatting instructions. The instructions may be performed by a calculation engine, a formatting engine, a browser-based engine, or the like.

In alternative embodiment, conditional formatting option 304 may be selected from the cell of a table column. For example, a user may select a cell containing "CO" and may choose to conditionally format the entire column based on that cell. In some examples, a recommendation may be provided to apply a certain formatting to all cells matching "CO" or, alternatively, all cells that do not match "CO." In yet another possible example, a recommendation may be provided to apply certain formatting based on state, such that each cell containing reference to a certain state (e.g., CO, WY, MA, TX, etc.) may have the same formatting, wherein the formatting is different for each state. In certain embodiments, one or more trained machine learning models may be implemented to generate such formatting recommendations.

Figure 4:
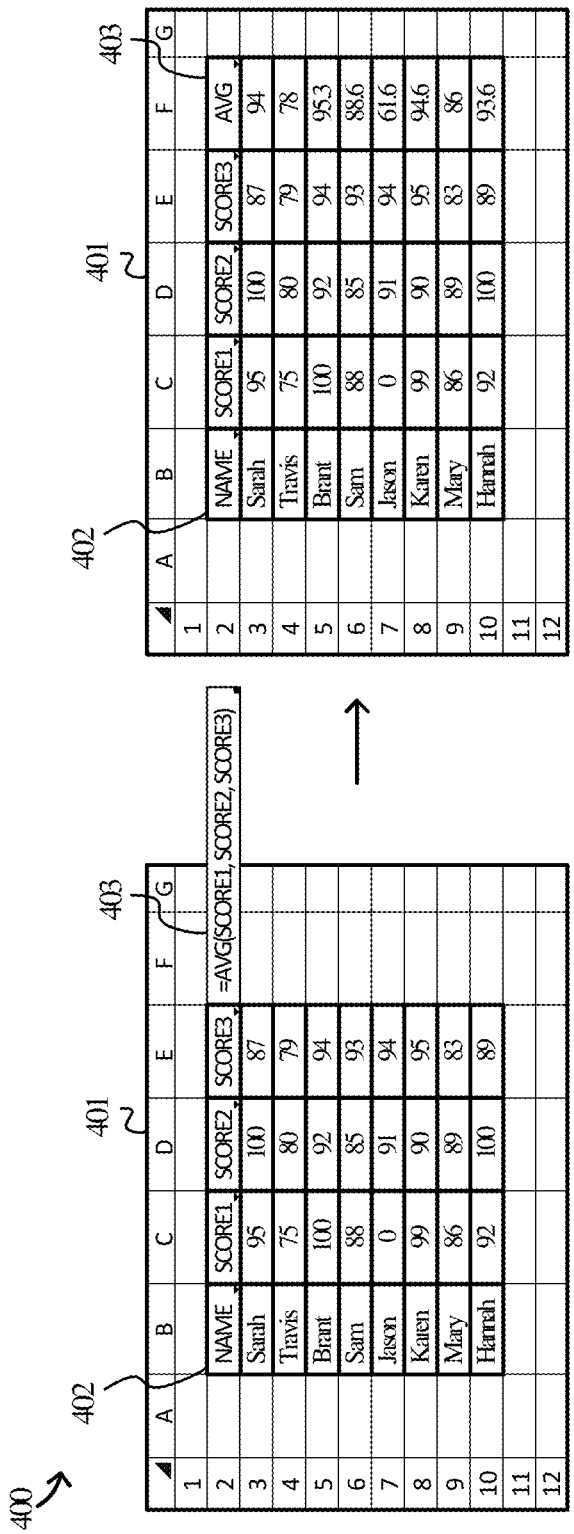
FIG. 4 illustrates an example of enhanced spreadsheet table functionality in accordance with some embodiments of the present technology.

FIG. 4 illustrates user experience 400 in an implementation, which includes two steps in accordance with enhanced spreadsheet table functionality as described herein. User experience 400 may be provided as the user interface of a spreadsheet application on computing device 101 (e.g., application 103), or by an application running in the context of online service 110. For example, user experience 300 may be employed by an application on computing device 101 (e.g., application 103), or by an application running in the context of online service 110

User experience 400 comprises spreadsheet 401. Spreadsheet 401 comprises table 402. In the first instance, moving from left to right, table 402 has four columns: name, score1, score2, and score3. Also in the first instance, a function is entered into cell 403, wherein cell 403 shares a row with the headers of each column of table 402. Upon entering the function into cell 403, an additional column is automatically added to table 402 and the function is applied throughout the corresponding column. In an alternative embodiment, a recommendation may be generated that suggests adding the new column to the table. In either scenario, cell 403 in the second instance has become the header of the new column, and the new column is populated with averages of score1, score2, and score3 for each row in table 402.

Figure 5:
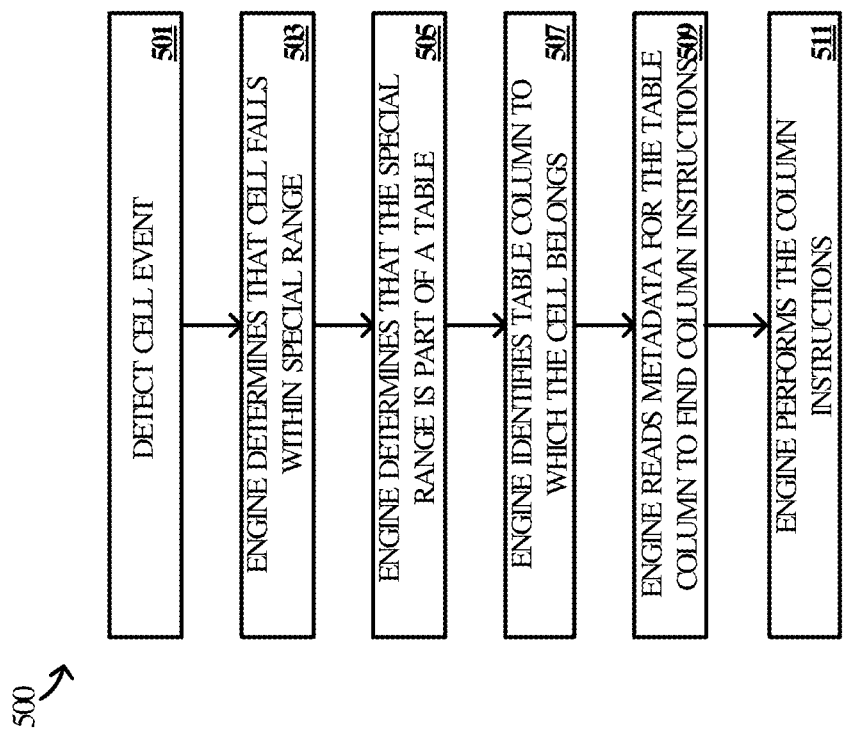
FIG. 5 illustrates a series of steps for applying enhanced spreadsheet table functionality in accordance with some embodiments of the present technology.

FIG. 5 illustrates process 500 for implementing enhanced spreadsheet tables as described herein. Process 500 may be implemented in program instructions in the context of any of the software applications, modules, components, or other such elements of one or more computing devices. For example, process 500 may be employed by an application on computing device 101 (e.g., application 103), or by an application running in the context of online service 110. The program instructions direct the one or more computing devices to operate as follows, referring to a computing device in the singular for purposes of clarity.

Process 500 includes step 501, in which a computing system detects a cell event inside a spreadsheet application. In step 503, an engine of the spreadsheet application (e.g., calculation engine, formatting engine, or combinations or variations thereof) is used to determine that a cell associated with the cell event falls within a special range, wherein the special range can be any range with user-defined rules or classifications already associated with it. In step 505, the engine determines that the special range is part of a table. In step 507, an engine of the spreadsheet application identifies a table column to which the cell belongs.

In step 509, an engine of the spreadsheet application reads metadata for the table column to find column instructions. It is of note that the metadata read by the engine is metadata that is explicitly associated with the table column—that is, it is stored at the table level. This is in contrast to existing systems in which metadata is stored in association with individual cells or a range of cells. In step 511, an engine of the spreadsheet application performs the column instructions that were found through the table's metadata. Performing the column instructions may include adding a formula to the cell according to table-column specifications, applying conditional formatting to the cell according to table-column specifications, adding data validation functionality to the cell according to table-column specifications, adding access control functionality to the cell according to table-column specifications, or other operations in accordance with the technology disclosed herein.

Figure 6:
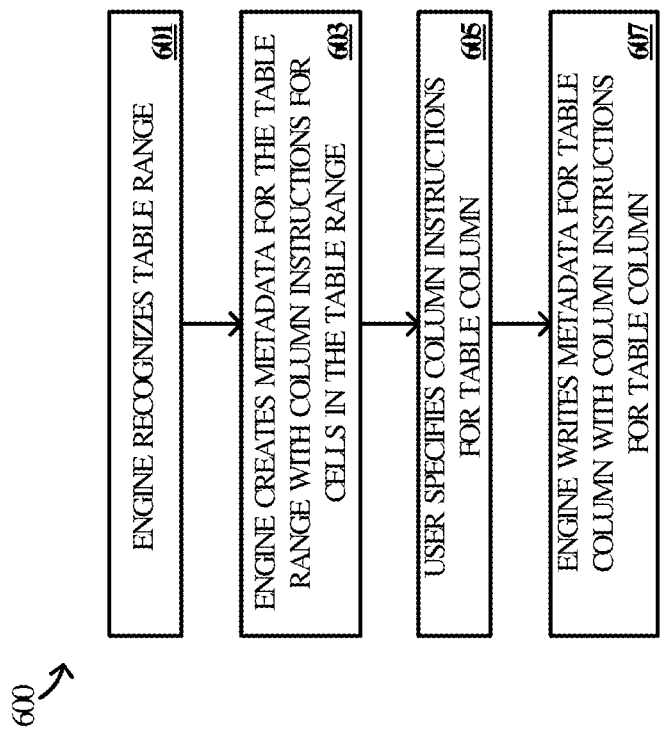
FIG. 6 illustrates a series of steps for applying enhanced spreadsheet table functionality in accordance with some embodiments of the present technology.

FIG. 6 illustrates process 600 for implementing enhanced spreadsheet tables as described herein. Process 600 may be implemented in program instructions in the context of any of the software applications, modules, components, or other such elements of one or more computing devices. For example, process 600 may be employed by an application on computing device 101 (e.g., application 103), or by an application running in the context of online service 110. The program instructions direct the one or more computing devices to operate as follows, referring to a computing device in the singular for purposes of clarity.

Process 600 includes step 601, in which an engine of a spreadsheet application recognizes a table range in a spreadsheet. Recognizing the table may include receiving user-input specifying the boundaries of a table object or automatically detecting an un-specified table via machine learning techniques, or variations or combinations of the two. In step 602, an engine of the spreadsheet application creates metadata for the table range with column instructions for cells in the table range, wherein the column instructions may be generic instructions for formatting a table or may include more specialized instructions as identified by the user or as determined appropriate by an engine of the spreadsheet application.

In step 605, a user specifies column instructions for a table column, wherein the column instructions may include a formula that is to be applied to the entire column, conditional formatting options, or similar table level operations as described herein. In step 607, an engine of the spreadsheet application writes metadata for the table column comprising the column instructions for the table column and the metadata is stored in associated with the entire table column.

Figure 7:
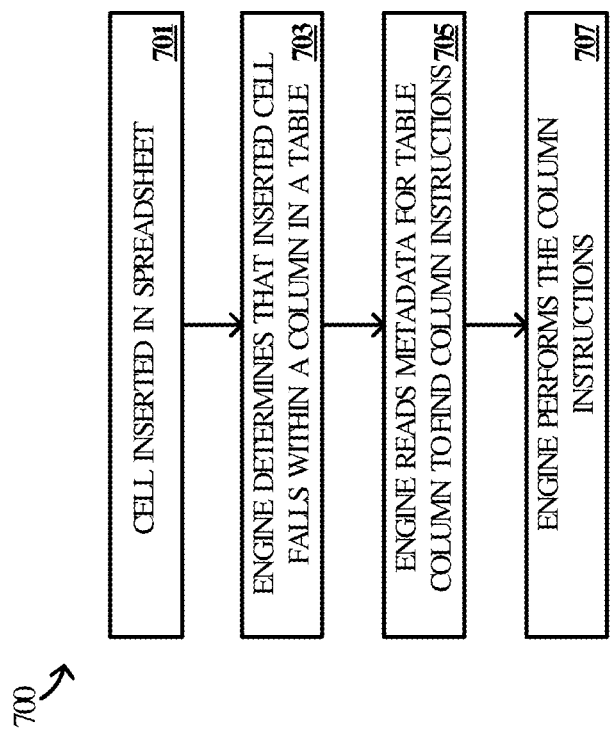
FIG. 7 illustrates a series of steps for applying enhanced spreadsheet table functionality in accordance with some embodiments of the present technology.

FIG. 7 illustrates process 700 for implementing enhanced spreadsheet tables as described herein. Process 700 may be implemented in program instructions in the context of any of the software applications, modules, components, or other such elements of one or more computing devices. For example, process 6700 may be employed by an application on computing device 101 (e.g., application 103), or by an application running in the context of online service 110. The program instructions direct the one or more computing devices to operate as follows, referring to a computing device in the singular for purposes of clarity.

Process 700 includes step 701, in which at least one cell is inserted into a spreadsheet. The at least one cell may be inserted by copying and pasting in another cell, or by inserting a new cell. In step 703, an engine of the spreadsheet application determines that the inserted cell falls within a column in a table. In step 705, an engine of the spreadsheet application reads metadata for the table column to find column instructions associated with the table column. In step 707, an engine of the spreadsheet application performs the column instructions for the column, including the new cell.

Figure 8:
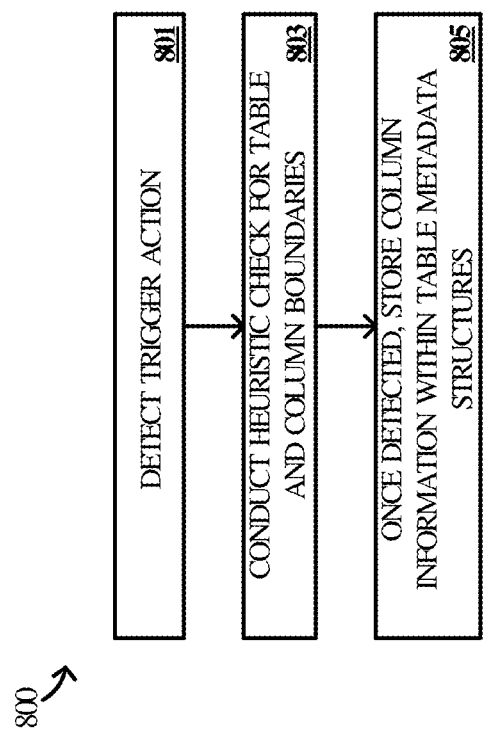
FIG. 8 illustrates a series of steps for applying enhanced spreadsheet table functionality in accordance with some embodiments of the present technology.

FIG. 8 illustrates process 800 for implementing enhanced spreadsheet tables as described herein. Process 800 may be implemented in program instructions in the context of any of the software applications, modules, components, or other such elements of one or more computing devices. For example, process 800 may be employed by an application on computing device 101 (e.g., application 103), or by an application running in the context of online service 110. The program instructions direct the one or more computing devices to operate as follows, referring to a computing device in the singular for purposes of clarity.

Process 800 includes step 801, in which the spreadsheet application detects a trigger action. The trigger action may comprise any change to a spreadsheet open in the spreadsheet application such as new content for a cell, a table object creation, a rearranging of cells, a copy and paste, an insert or delete, or the like. In step 803, the spreadsheet application conducts a heuristic check for table and column boundaries. In step 805, once table and column boundaries have been detected, the spreadsheet application stores column information within metadata structures for the table.

Figure 9:
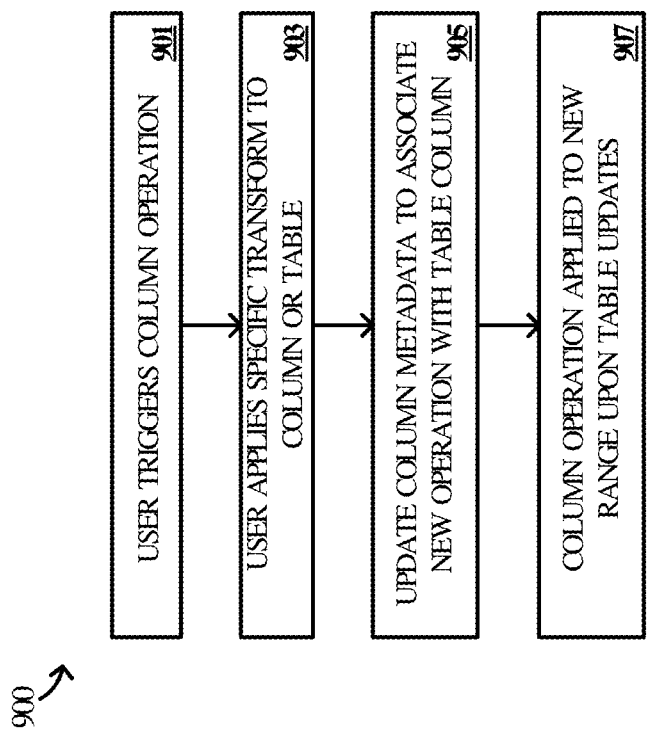
FIG. 9 illustrates a series of steps for applying enhanced spreadsheet table functionality in accordance with some embodiments of the present technology.

FIG. 9 is a flowchart illustrating a series of steps for implementing enhanced spreadsheet tables as described herein. Process 900 includes step 901, in which a user triggers a column operation in a spreadsheet application running on a computing device. In step 903, the user applies a specific transform to a column of a table or the entire table. In step 905, one or more engines of the spreadsheet application updates column metadata to associate the new operation with at least one table column. In step 907, the new column operation is applied to any new range of the column upon updates to the table.

Figure 10B:
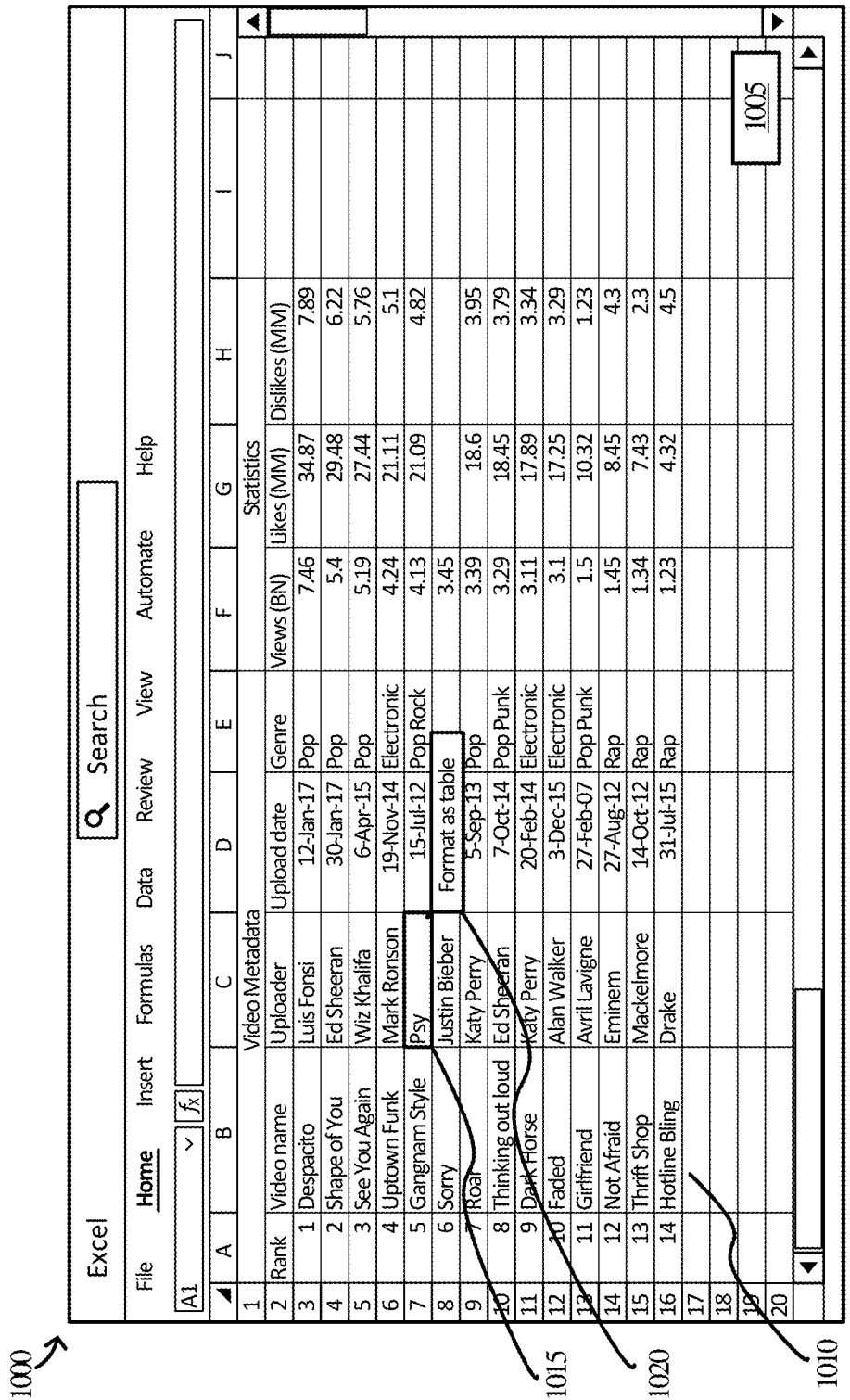

FIGS. 10A-10D illustrate a user experience for formatting data in a grid as a structured table in accordance with some embodiments of the present technology. The user experience comprises user interface 1000 of a spreadsheet application. Spreadsheet application, in accordance with the present example, automatically detects a table-like structure and its boundaries and provides an option to format the unstructured into a structured table. User interface 1000 comprises grid 1005. FIG. 10A illustrates raw data 1010 in grid 1005, wherein little or no formatting has been applied to raw data 1010.

Figure 10C:
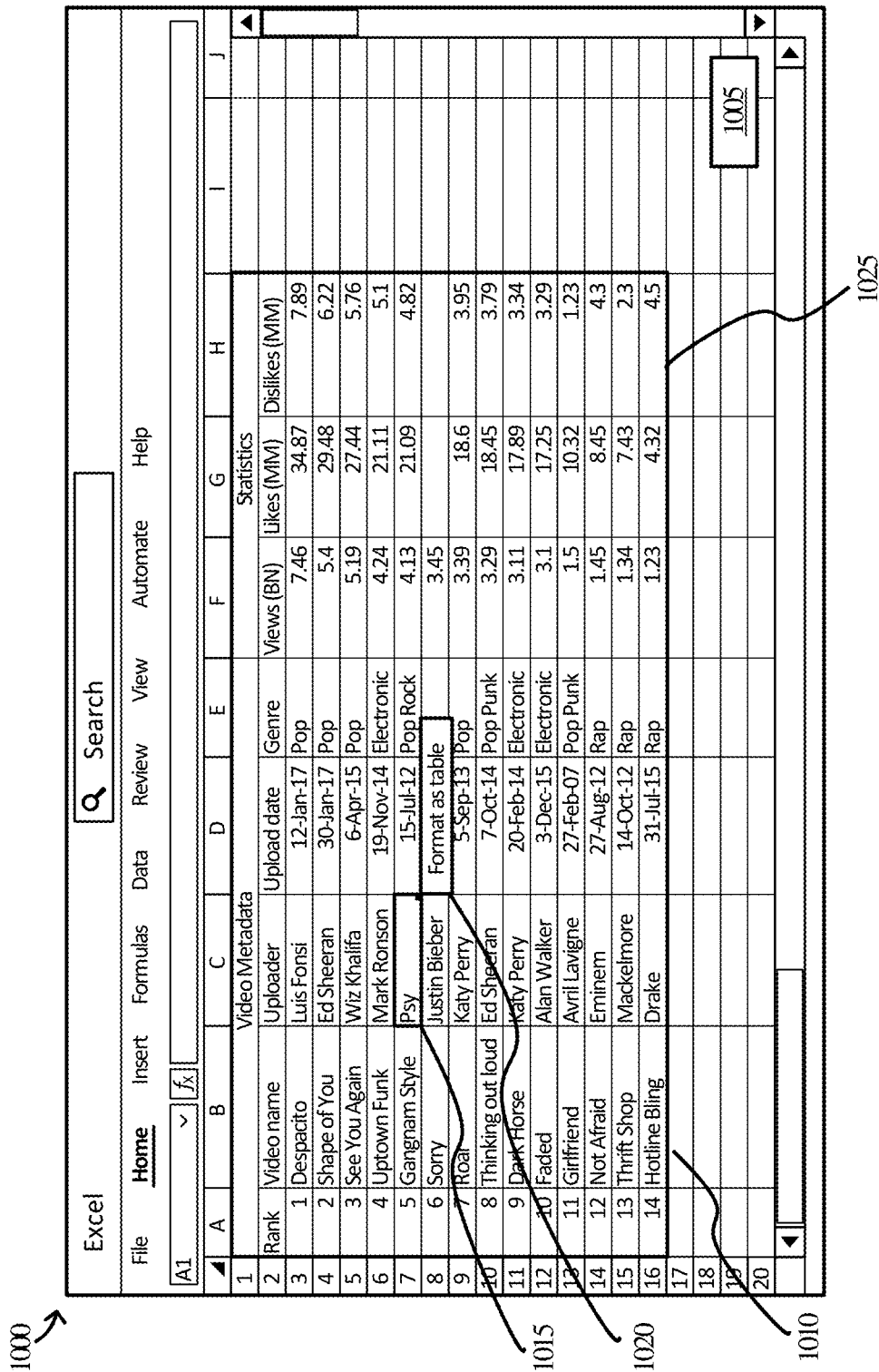

In FIG. 10B, upon a selection of cell 1015, the spreadsheet application surfaces format as table suggestion 1020, wherein format as table suggestion 1020 is generated based on the automatic detection of the table-like structure of the raw data. FIG. 10C shows identified boundary 1025 which user interface 1000 may show in some embodiments to identify to the user what table boundary the application has detected. FIG. 10D shows the user experience once the structured table formatting has been applied to create table 1030 after selection of format as table suggestion 1020.

Figure 11A:
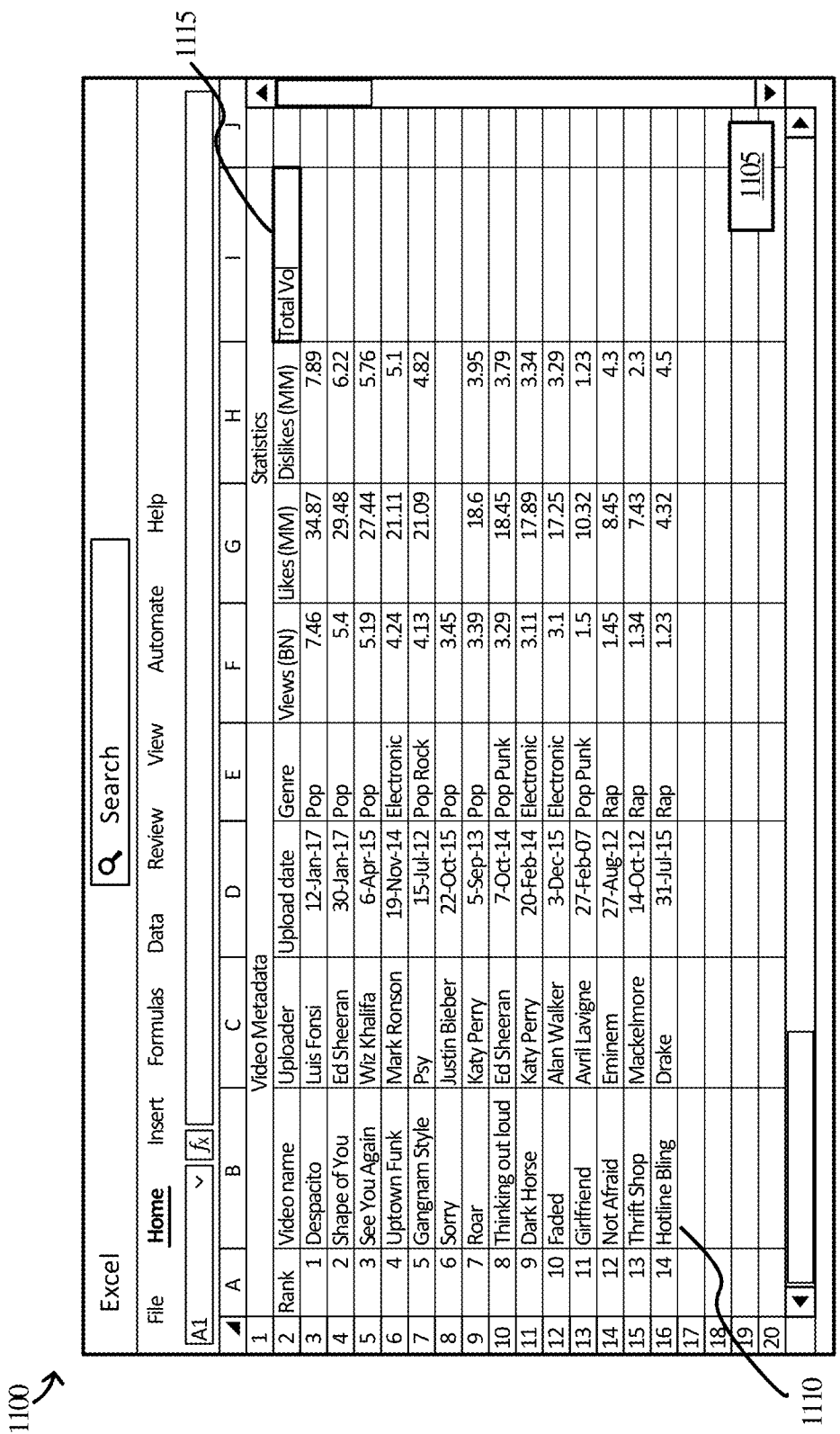
FIGS. 11A-11D illustrate an example of enhanced spreadsheet functionality in accordance with some embodiments of the present technology.

FIGS. 11A-11D illustrate a user experience of a spreadsheet process for recommending a formula for an unstructured table based on detected data in a spreadsheet in accordance with aspects of the present technology. FIG. 11A includes user interface 1100, which includes grid 1105. Grid 1105 includes unstructured data table 1110. FIG. 11A further shows a header being typed into cell 1115, wherein cell 1115 is adjacent to "Dislikes (millions)" column header and shares a row with all column headers in raw data 1010.

Figure 11B:
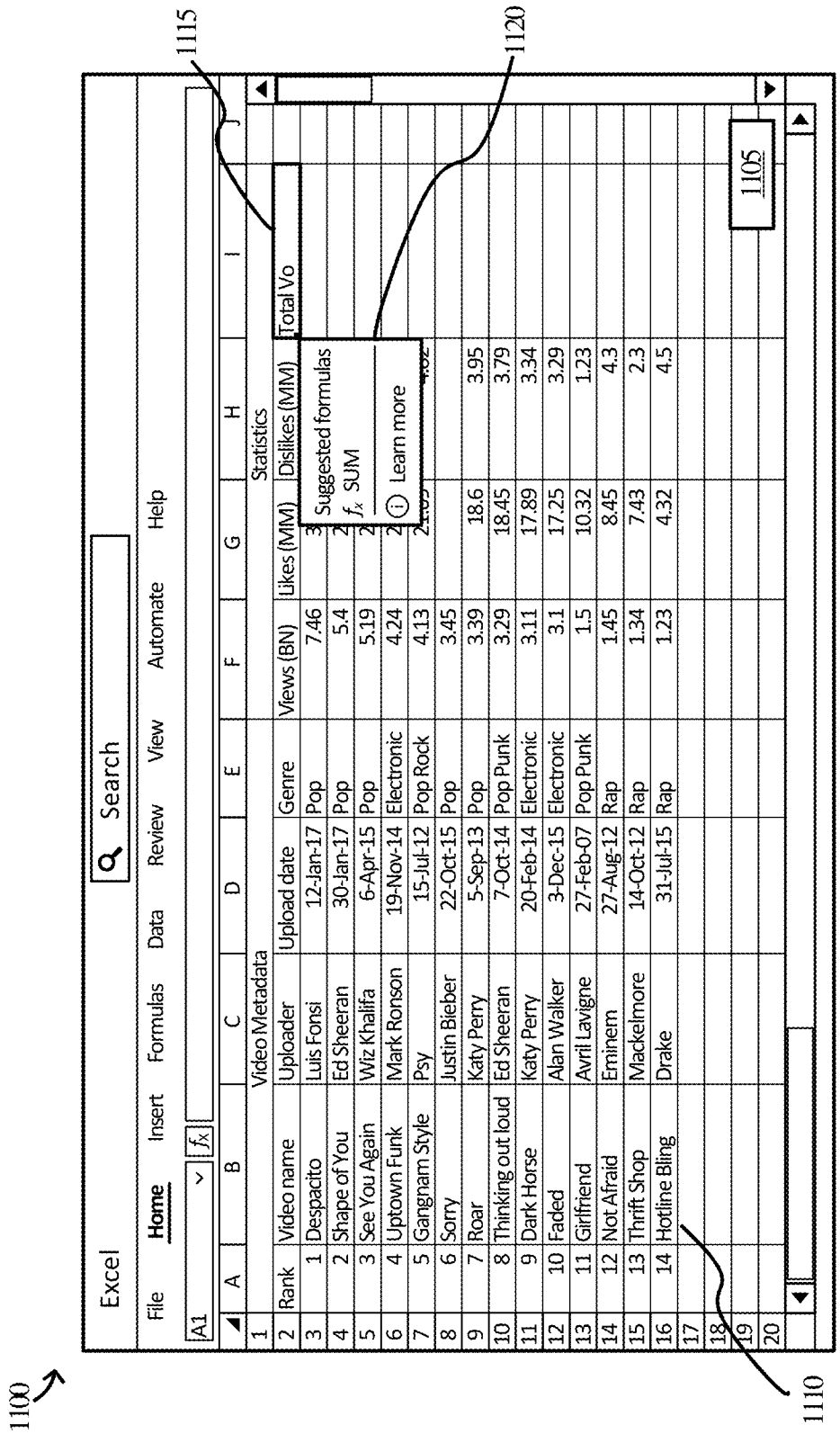
Figure 11C:
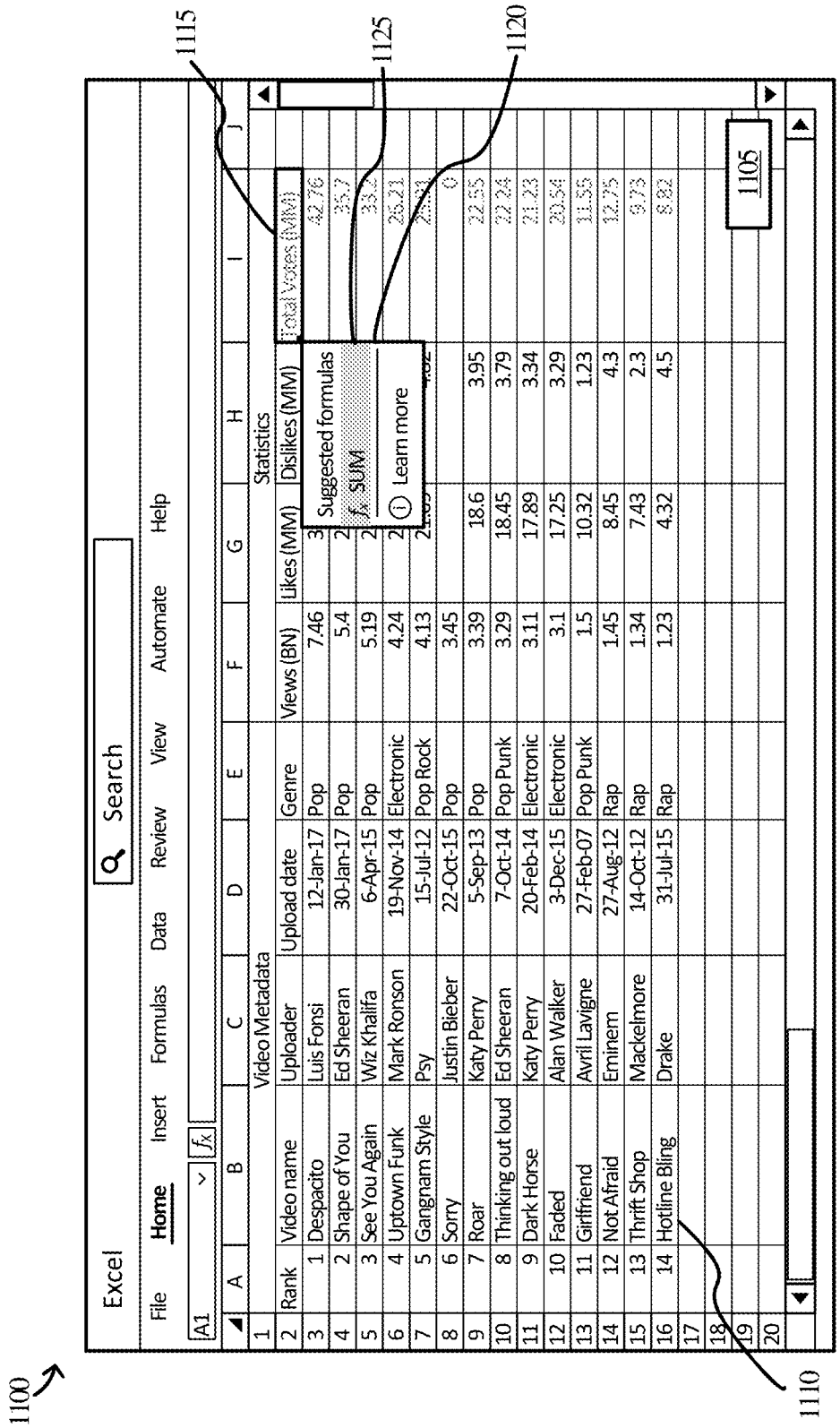
Figure 11D:
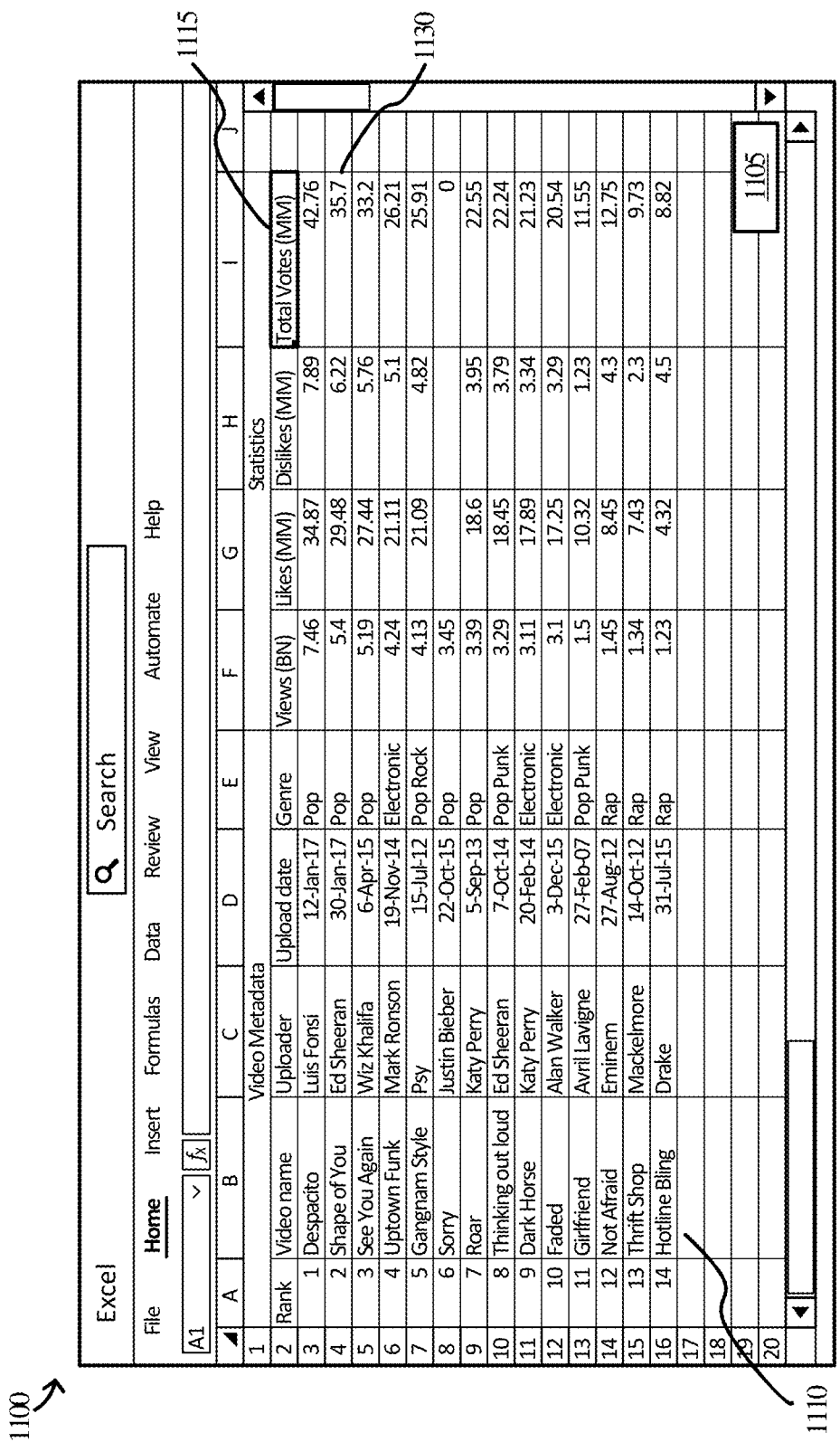

FIG. 11B includes suggested formula box 1120, wherein suggested formula box 1120 is automatically shown in user interface 1100 in response to the header being typed into cell 1115. FIG. 11C illustrates the selection of SUM formula 1125 in suggested formula box 1120. In response to the selection of SUM formula 1125, new column 1130 is added to unstructured data table 1110 showing total votes.

Figure 12C:
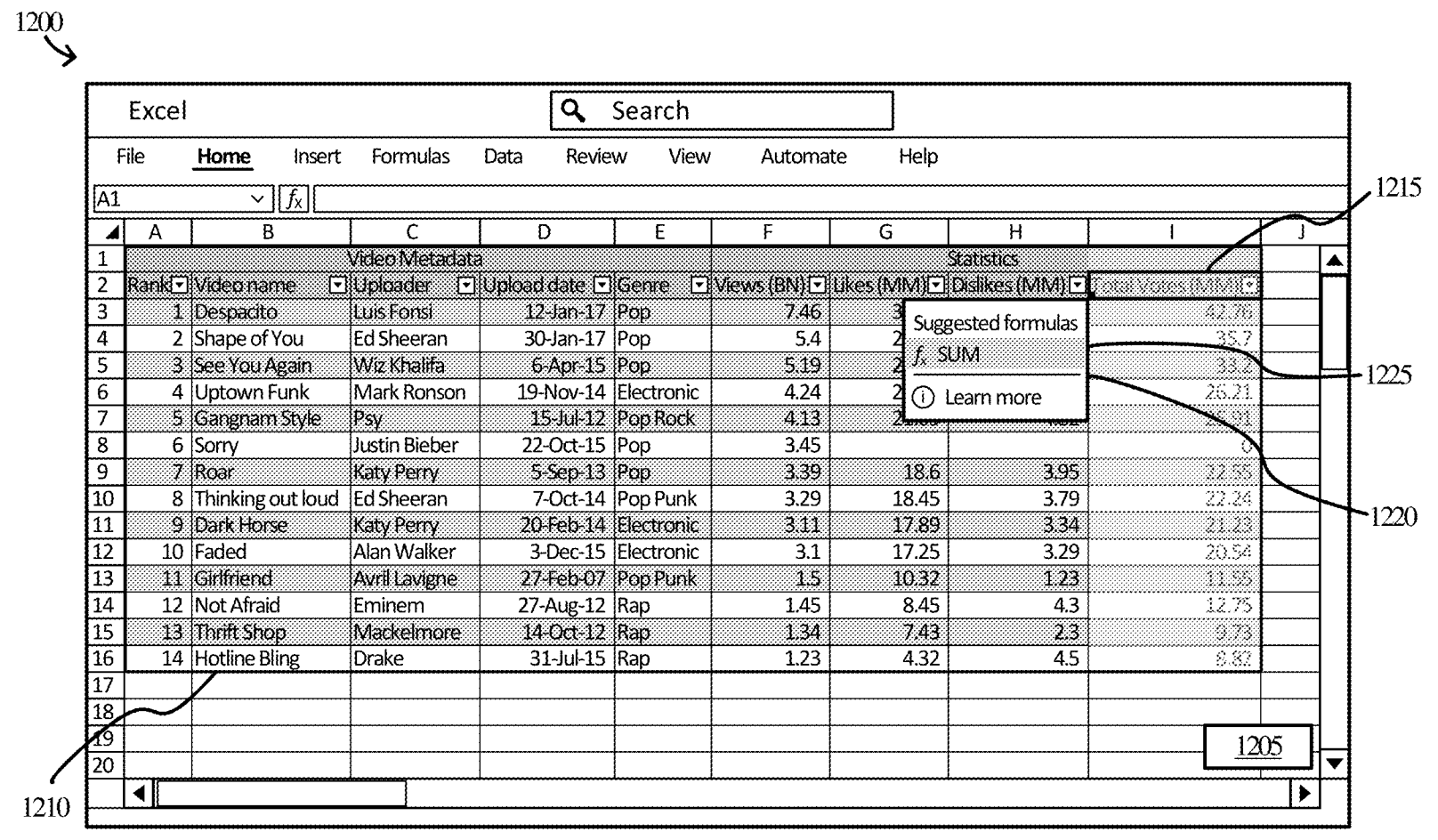

FIGS. 12A-12D illustrate a user experience of a spreadsheet process for recommending a formula for a structured table based on the data detected inside the table in the spreadsheet in accordance with aspects of the present technology. The user experience comprises user interface 1200 of a spreadsheet application. User interface 1200 comprises grid 1205, wherein grid 1205 includes structured table 1210. FIG. 12A illustrates a new header being typed into cell 1215, wherein cell 1215 is in the same row as the rest of the column headers of structured table 1210 and is adjacent to the "Dislikes (millions)" column header cell.

FIG. 12B includes suggested formula box 1220, wherein suggested formula box 1220 is automatically shown in user interface 1200 in response to the new header being typed into cell 1215. FIG. 12C illustrates the selection of SUM formula 1225 in suggested formula box 1220. In response to the selection of SUM formula 1225, new column 1230 is added to structured table 1210 showing total votes.

Figure 13A:
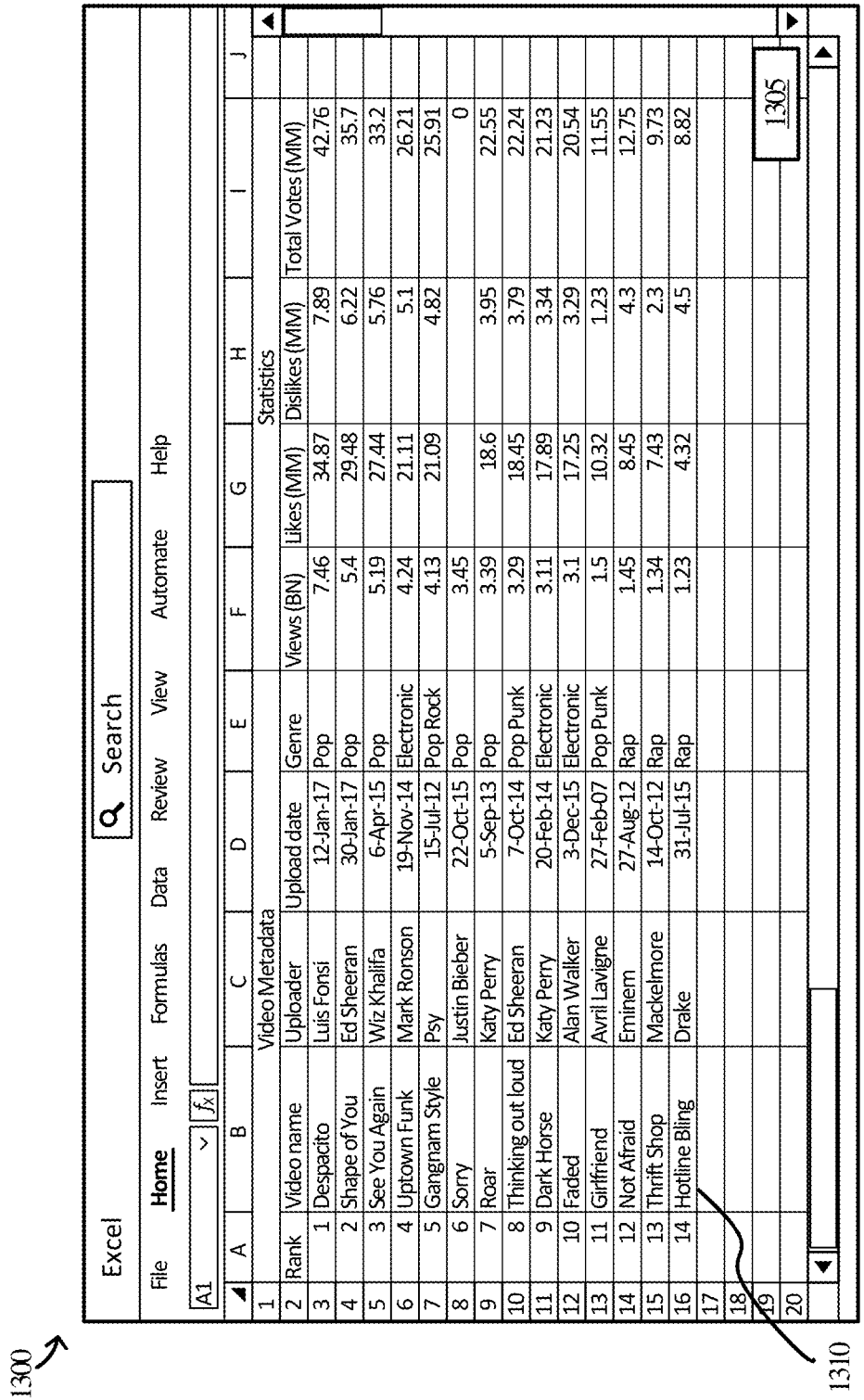
Figure 13B:
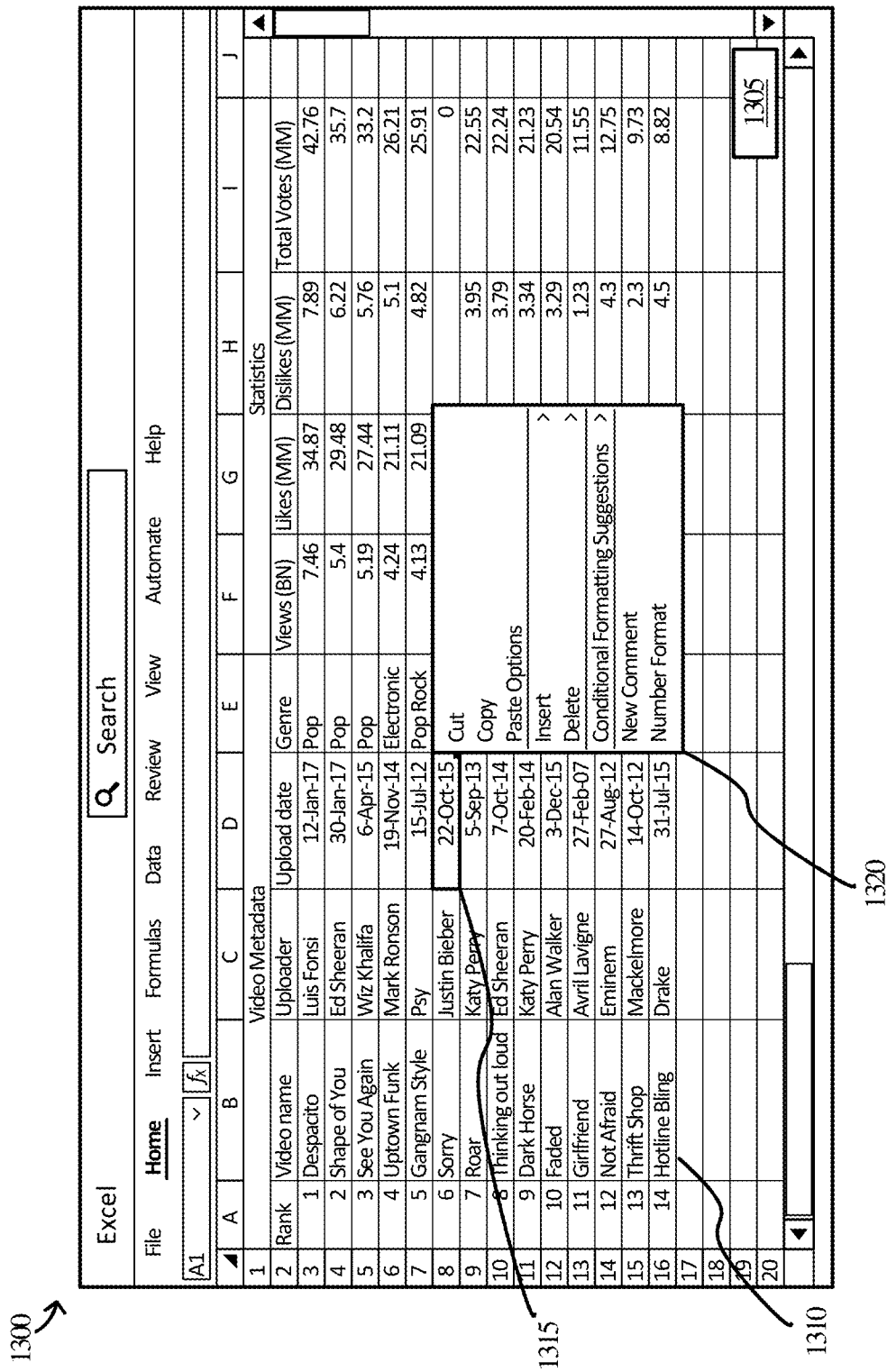

FIGS. 13A-13D illustrate a user experience of a spreadsheet process for providing conditional formatting operations for unstructured tables in spreadsheets in accordance with aspects of the present technology. A spreadsheet application, in accordance with the present example, provides functionality to apply conditional formatting based on the content of a selected cell in a spreadsheet table. The user experience of FIG. 13A comprises user interface 1300 of the spreadsheet application. User interface comprises grid 1305, wherein grid 1305 includes unstructured table 1310, illustrated in FIG. 13A. FIG. 13B further illustrates the surfacing of options box 1320, wherein options box 1320 is surfaced, in one example, upon right-click of cell 1315.

Figure 13C:
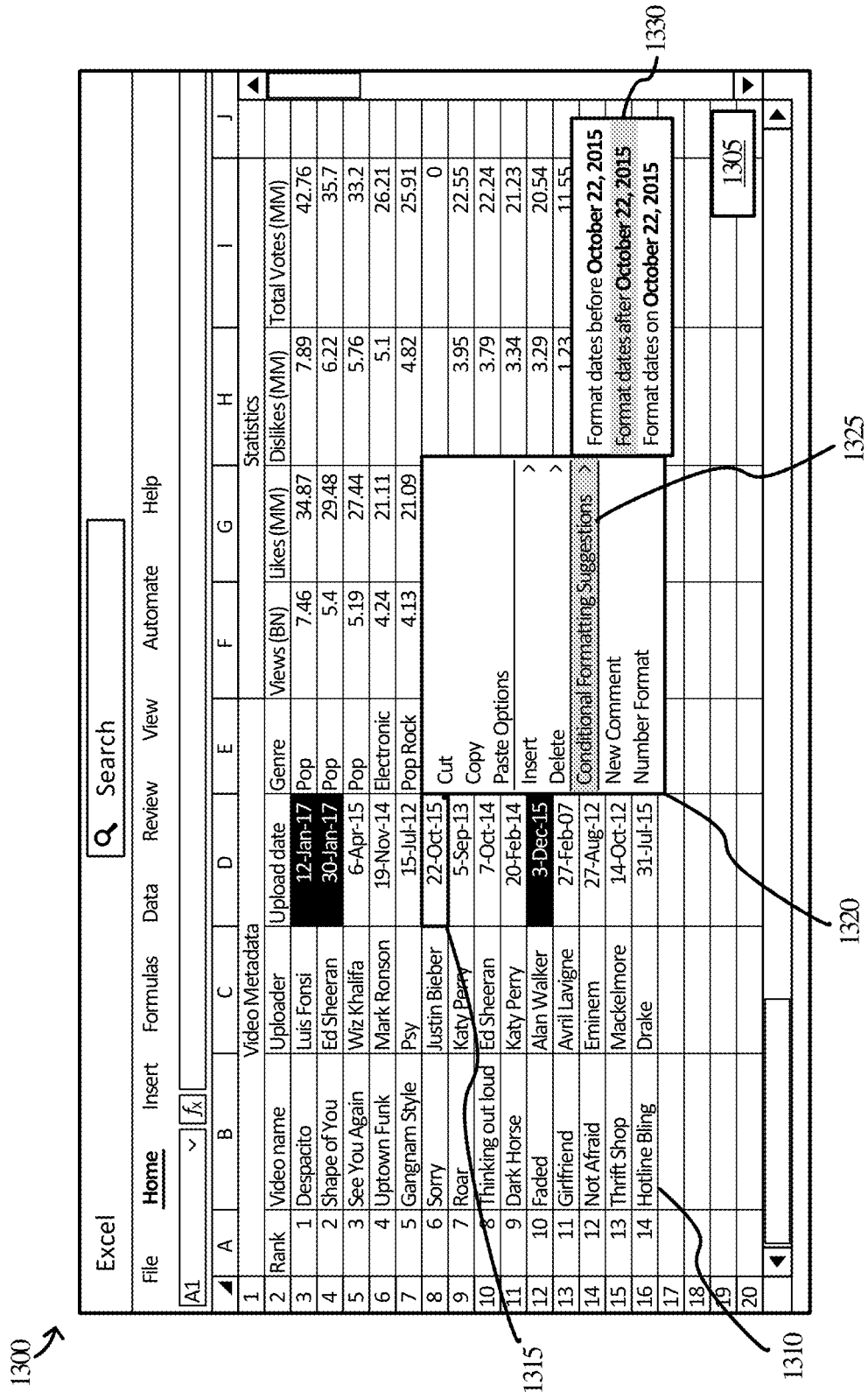

FIG. 13C illustrates the selection of a conditional formatting suggestion, wherein conditional formatting suggestions are provided as an option available in options box 1320 as conditional formatting suggestions option 1325. Within conditional formatting suggestions option 1325, are a variety of selections based on the content of cell 1315. In the present example, "Format dates after Oct. 22, 2015" option 1330 is selected, wherein all of the available options are based around the date, Oct. 22, 2015, in cell 1315. FIG. 13D illustrates the final result after selecting "Format dates after Oct. 22, 2015" option 1330, wherein the final result is unstructured table 1310 having each cell with a date after Oct. 22, 2015 in the "upload date" column being formatted in the same way.

Figure 14B:
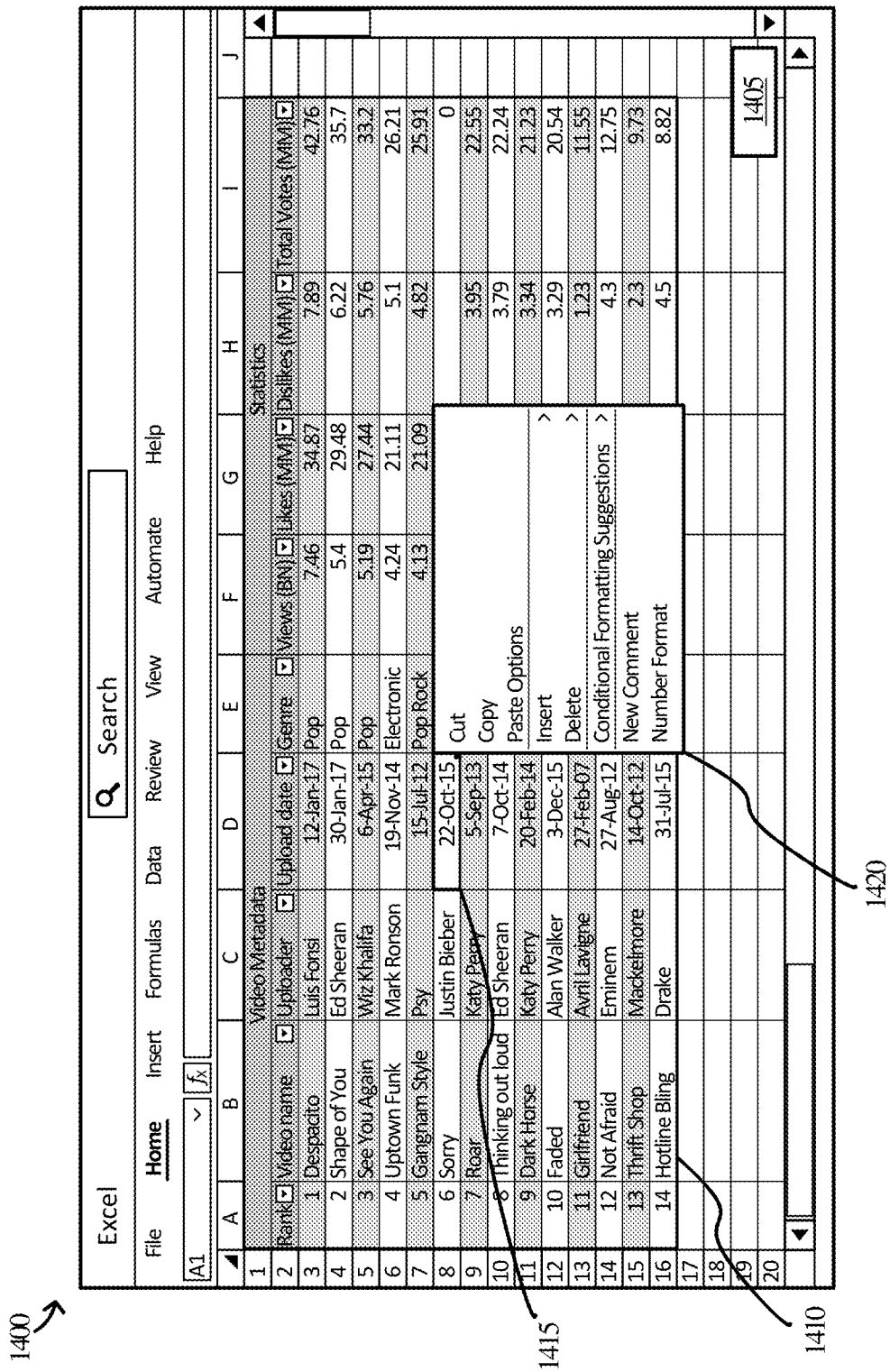

FIGS. 14A-14D illustrate a user experience of a spreadsheet process for providing conditional formatting operations for structured tables in spreadsheets in accordance with aspects of the present technology. A spreadsheet application, in accordance with the present example, provides functionality to apply conditional formatting based on the content of a selected cell in a spreadsheet table. The user experience of FIG. 14A comprises user interface 1400 of the spreadsheet application. User interface comprises grid 1405, wherein grid 1405 includes structured table 1410, illustrated in FIG. 14A. FIG. 14B further illustrates the surfacing of options box 1420, wherein options box 1420 is surfaced, in one example, upon right-click of cell 1415.

Figure 14C:
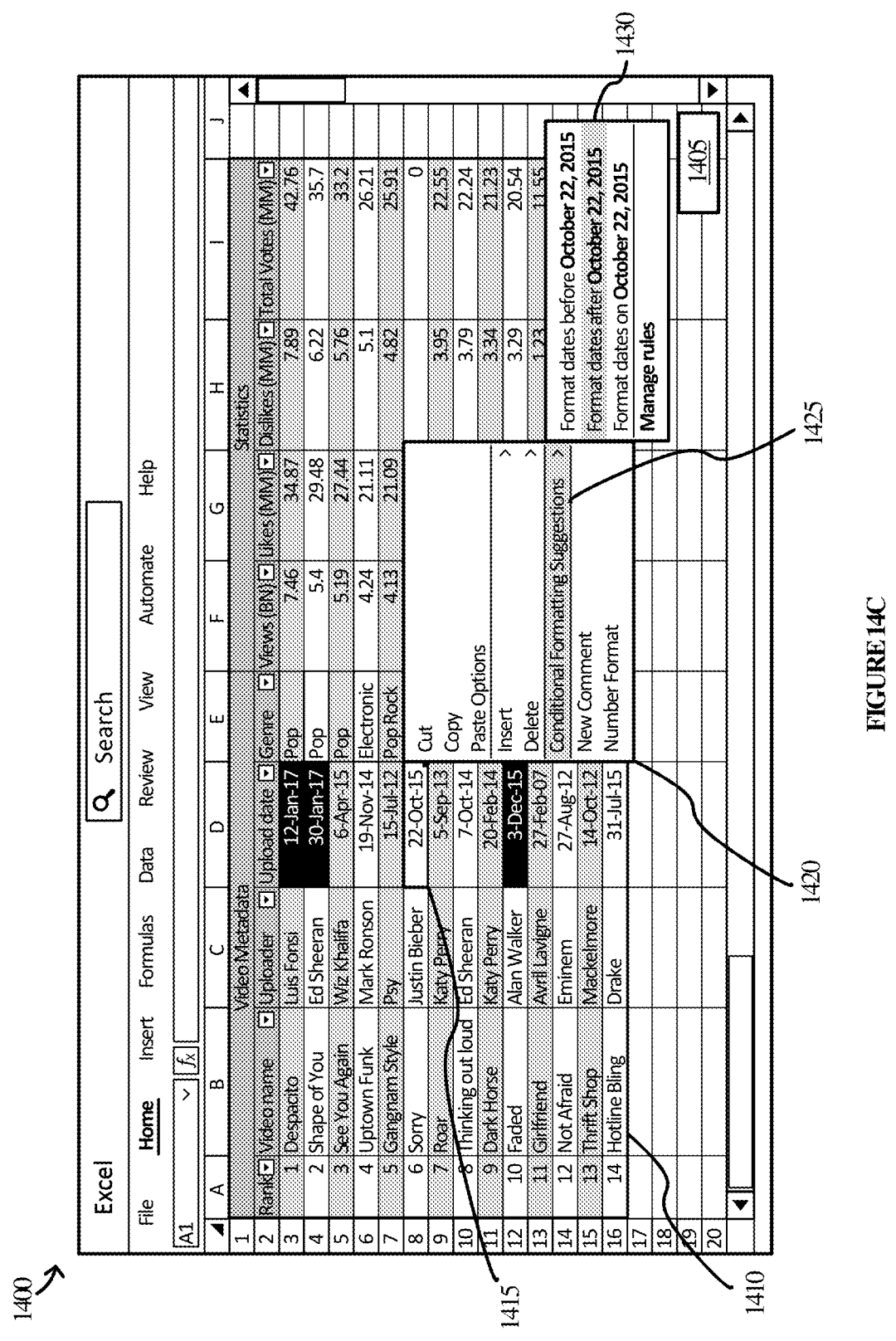

FIG. 14C illustrates the selection of a conditional formatting suggestion, wherein conditional formatting suggestions are provided as an option available in options box 1420 as conditional formatting suggestions option 1425. Within conditional formatting suggestions option 1425, are a variety of selections based on the content of cell 1415. In the present example, "Format dates after Oct. 22, 2015" option 1430 is selected, wherein all of the available options are based around the date, Oct. 22, 2015, in cell 1415. FIG. 14D illustrates the final result after selecting "Format dates after Oct. 22, 2015" option 1430, wherein the final result is structured table 1410 having each cell with a date after Oct. 22, 2015 in the "upload date" column being formatted in the same way.

Figure 15A:

FIGS. 15A-15D illustrate a user experience of a spreadsheet process for providing data validation functionality for unstructured tables in spreadsheets in accordance with aspects of the present technology. A spreadsheet application, in accordance with the present example, provides functionality and suggestions for applying data validation to a table column. The spreadsheet application may then apply the data validation operation to the proper range according to data stored for the unstructured table. The user experience of FIG. 15A comprises user interface 1500 of the spreadsheet application. User interface comprises grid 1505, wherein grid 1505 includes unstructured table 1510, illustrated in FIG. 15A. FIG. 15B further illustrates the surfacing of options box 1520, wherein options box 1520 is surfaced, in one example, upon selection and right-click of column 1515.

Figure 15C:
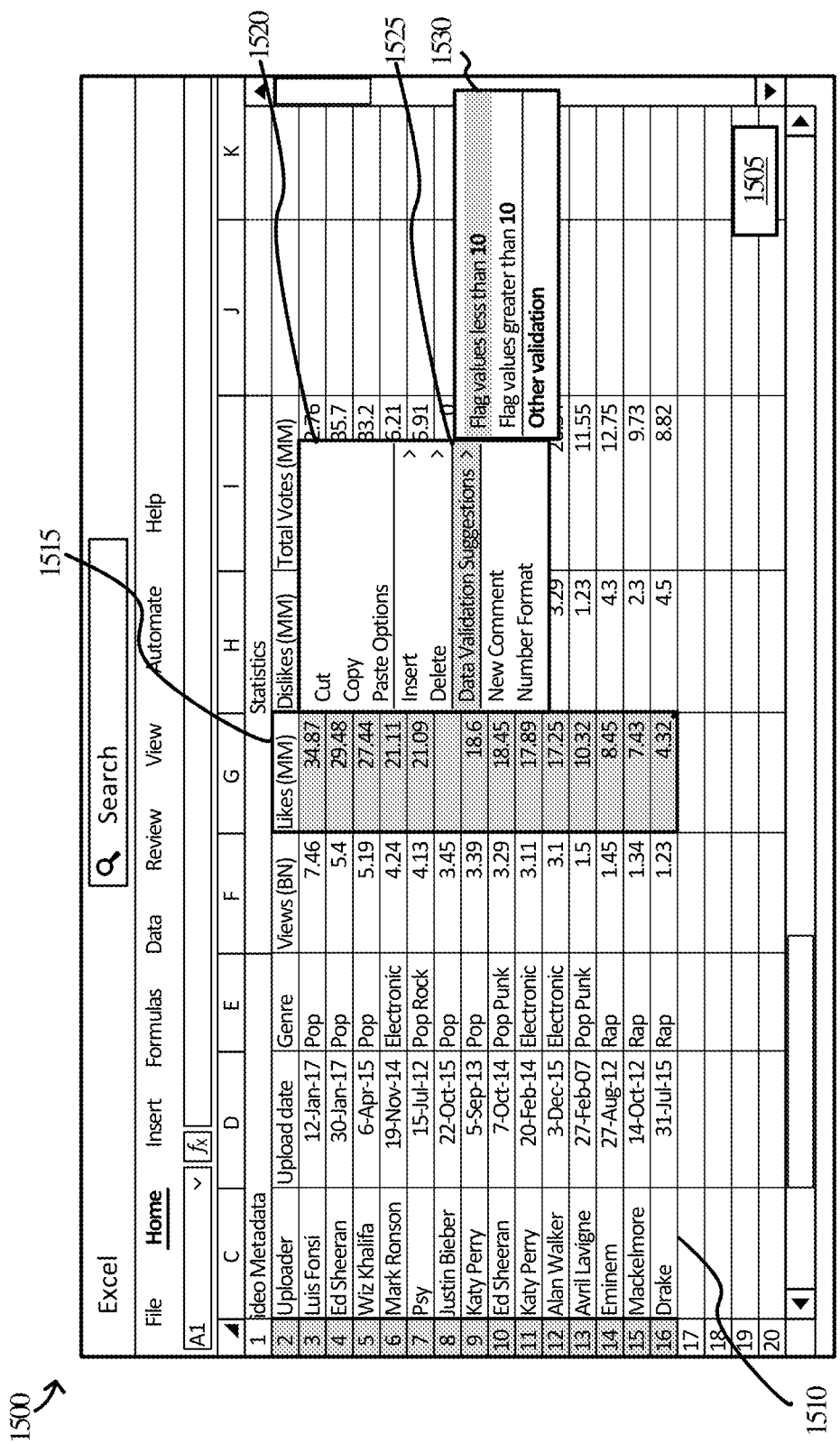

FIG. 15C illustrates the selection of a data validation suggestion, wherein data validation suggestions are provided as an option available in options box 1520 as data validation suggestions option 1525. Within data validation suggestions option 1525, are a variety of selections based on the content of column 1515. In the present example, "Flag values less than 10" option 1530 is selected, wherein all of the available options are based around the contents of column 1515. FIG. 15D illustrates the final result after selecting "Flag values less than 10" option 1530, wherein the final result is unstructured table 1510 having each cell with a value less than 10 in column 1515 being identified with flag 1535.

Figure 16A:
Figure 16B:
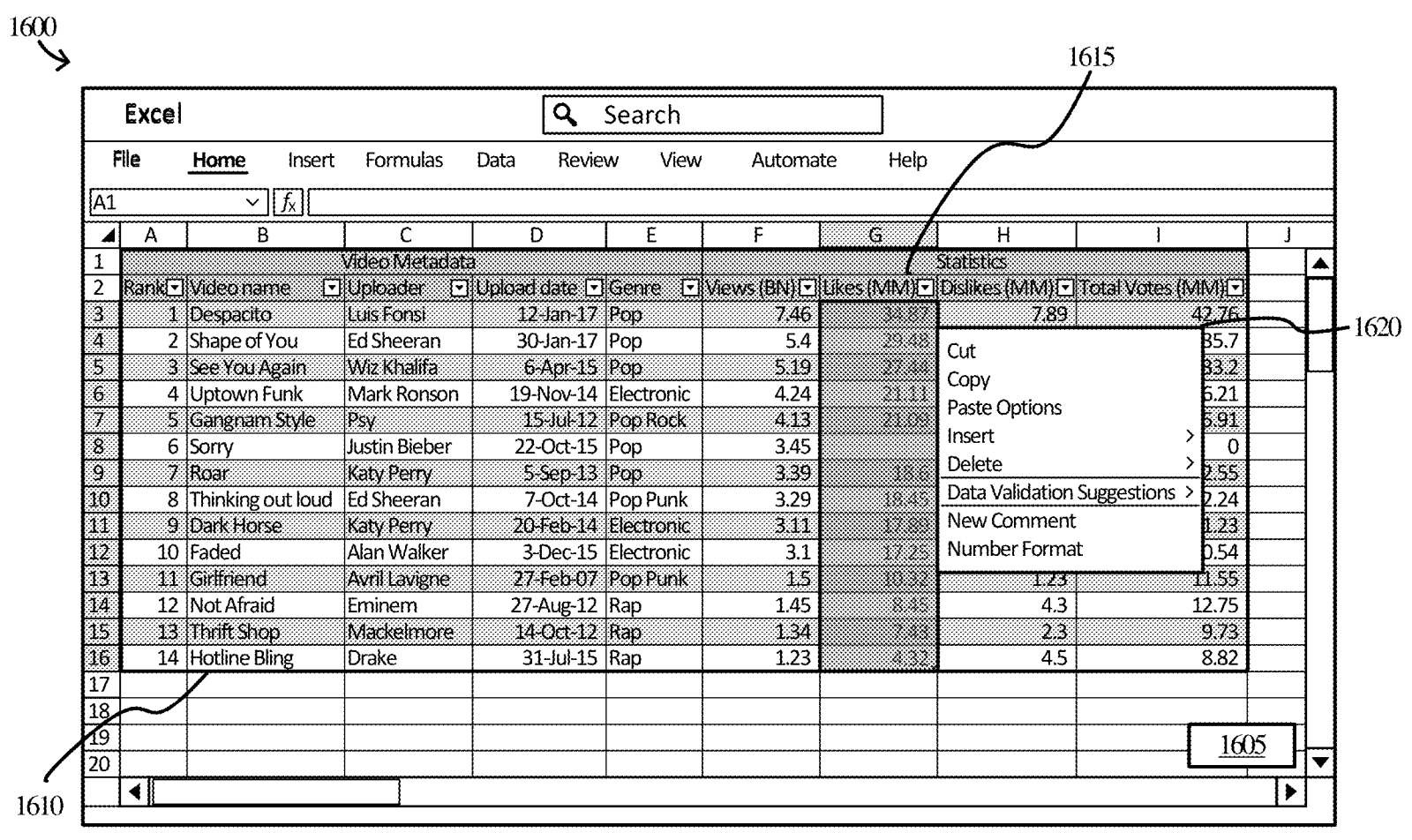

FIGS. 16A-16D illustrate a user experience of a spreadsheet process for providing data validation functionality for structured tables in spreadsheets in accordance with aspects of the present technology. A spreadsheet application, in accordance with the present example, provides functionality and suggestions for applying data validation to a table column. The spreadsheet application may then apply the data validation operation to the proper range according to data stored for the table. The user experience of FIG. 16A comprises user interface 1600 of the spreadsheet application. User interface comprises grid 1605, wherein grid 1605 includes structured table 1610, illustrated in FIG. 16A. FIG. 16B further illustrates the surfacing of options box 1620, wherein options box 1620 is surfaced, in one example, upon selection and right-click of column 1615.

Figure 16C:
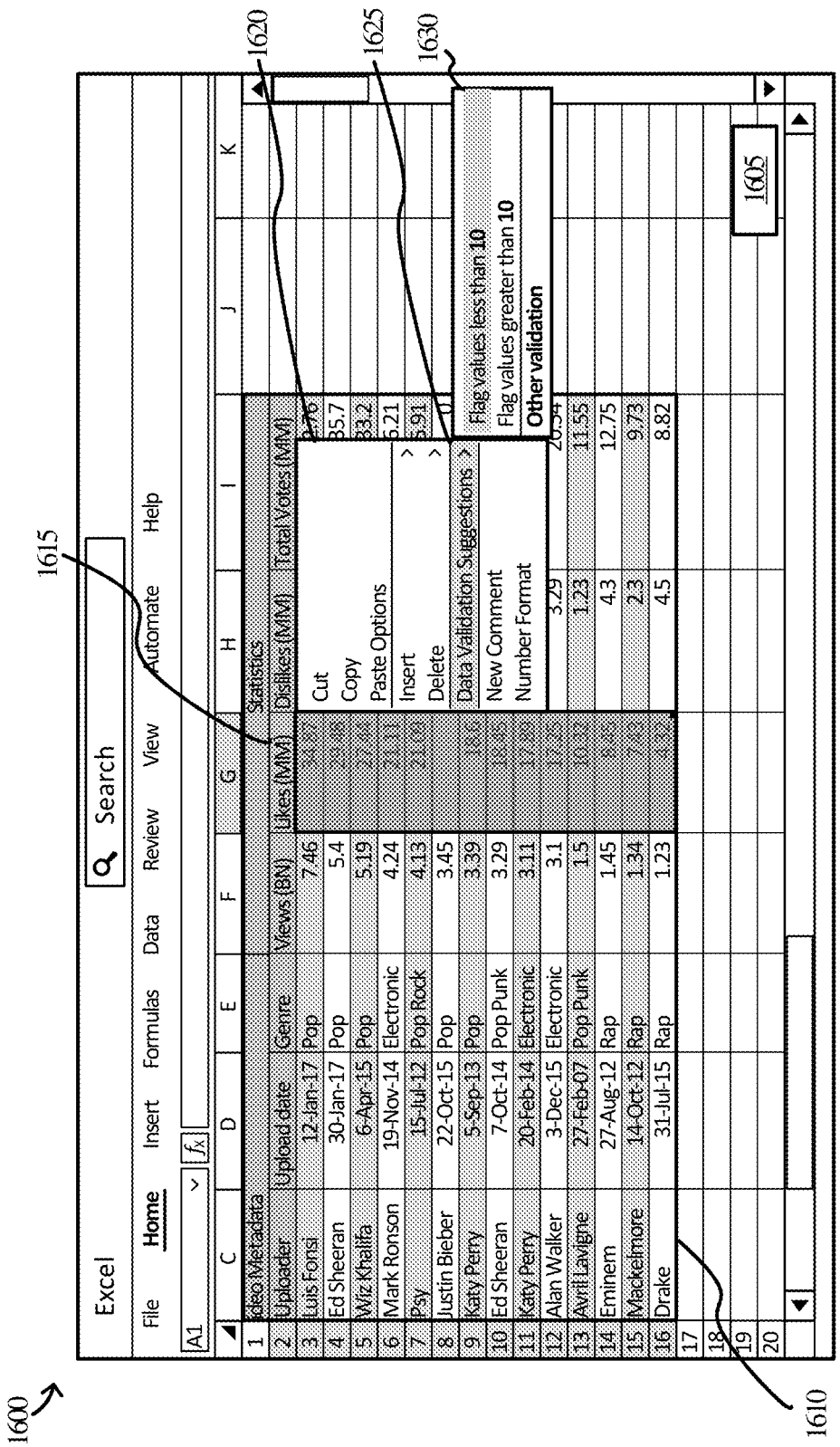
Figure 16D:
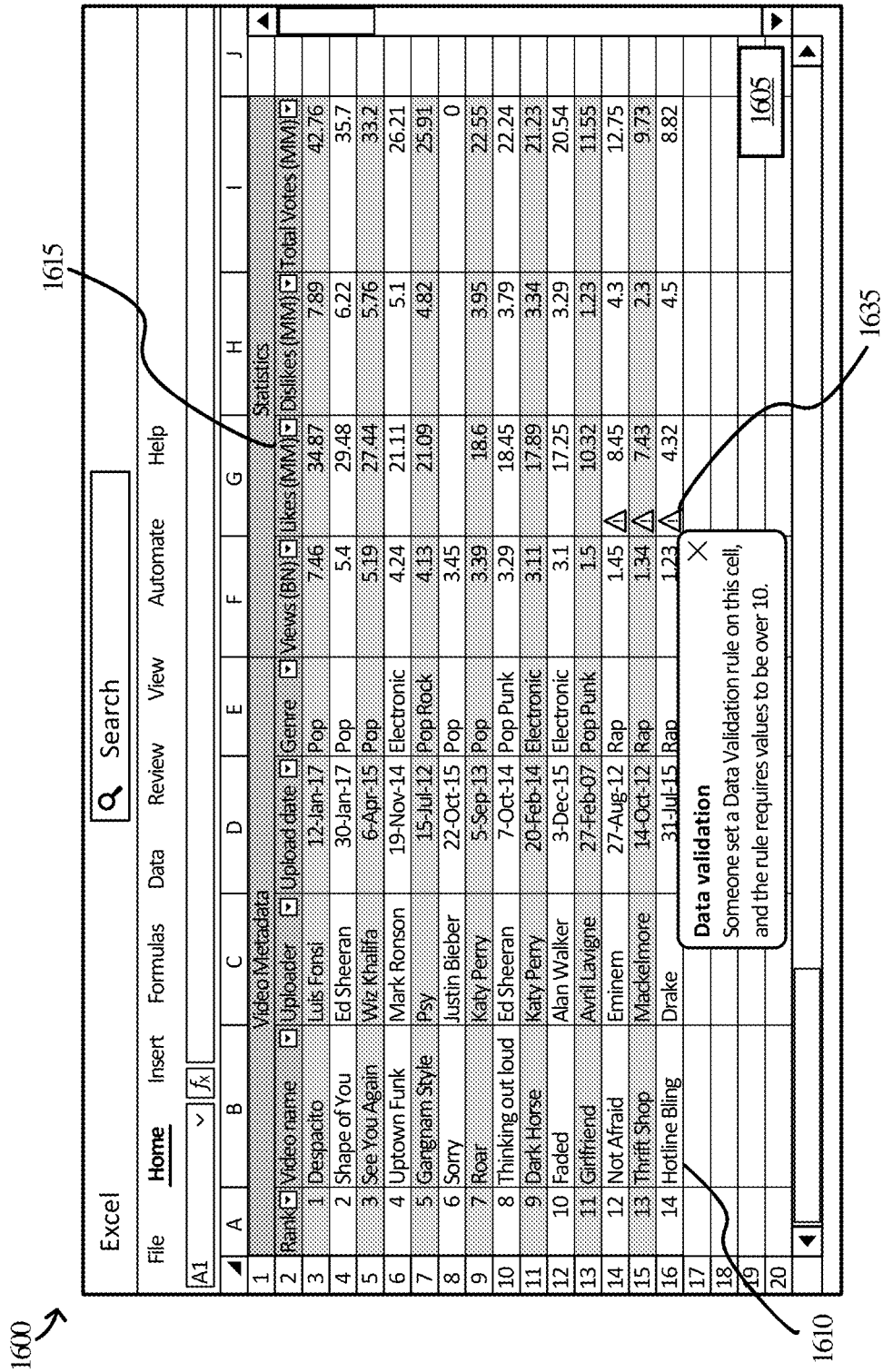

FIG. 16C illustrates the selection of a data validation suggestion, wherein data validation suggestions are provided as an option available in options box 1620 as data validation suggestions option 1625. Within data validation suggestions option 1625, are a variety of selections based on the content of column 1615. In the present example, "Flag values less than 10" option 1630 is selected, wherein all of the available options are based around the contents of column 1615. FIG. 16D illustrates the final result after selecting "Flag values less than 10" option 1630, wherein the final result is structured table 1610 having each cell with a value less than 10 in column 1615 being identified with flag 1635.

Figure 17A:
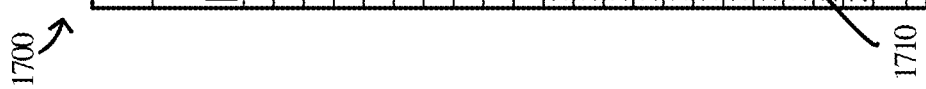
Figure 17B:
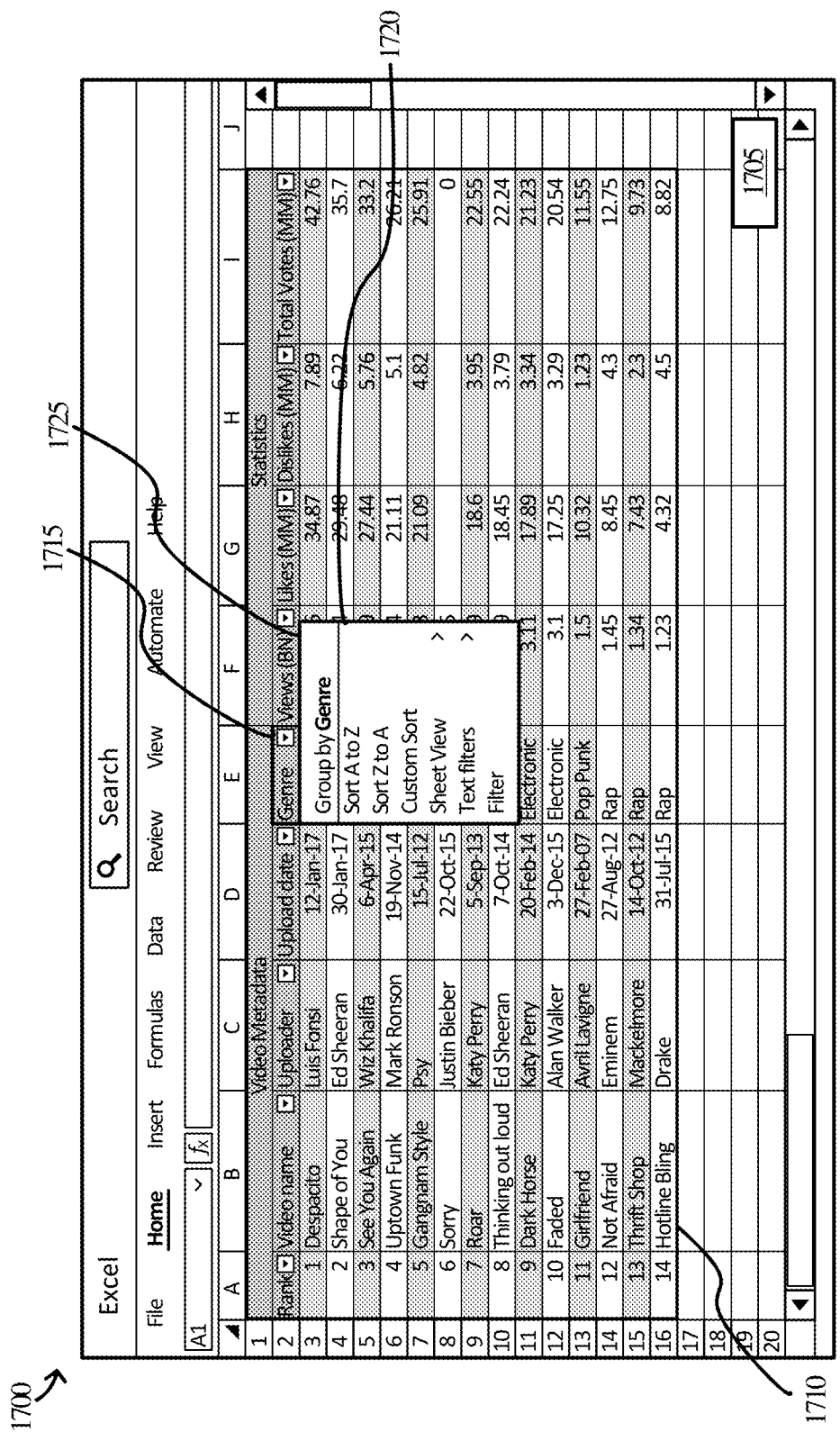

FIGS. 17A-17C illustrate a user experience of a spreadsheet process for providing group by category functionality in accordance with aspects of the present technology. A spreadsheet application, in accordance with the present example, allows a user to opt to group rows of a table by a category, such as genre. In some embodiments, grouping by category may be recommended in the user interface by the spreadsheet application. In response to a direction to group by category, the spreadsheet application rearranges the table based on the selected category and optionally creates automatic headings for each group.

The user experience of FIG. 17A comprises user interface 1700 of the spreadsheet application. User interface comprises grid 1705, wherein grid 1705 includes table 1710. FIG. 17B further illustrates the surfacing of options box 1720, wherein options box 1720 is surfaced, in one example, upon selection and right-click of column 1715, or a cell within column 1715, including the header cell. Options box 1720 comprises Group by Genre option 1725, wherein Group by Genre option 1725 is created based on the content of column 1715.

FIG. 17C illustrates the final result after selecting Group by Genre option 1725, wherein the final result is table 1710 being grouped by category, such that each genre in column 1715 is grouped together, with section header rows being automatically inserted between each category.

In accordance with the implementation shown in FIGS. 17A-17B, a computing device may perform operations as follows: maintain a spreadsheet table, wherein the spreadsheet table comprises at least one category column; receive an instruction to group the table based on categories in the category column; and in response to receiving the instruction, arrange table entries based on their respective category such that table entries having the same category are adjacent to each other to form a group. The computing device may further add category headers delineating each group.

Figure 18A:
FIGS. 18A-18D illustrate an example of enhanced spreadsheet functionality in accordance with some embodiments of the present technology.
Figure 18B:
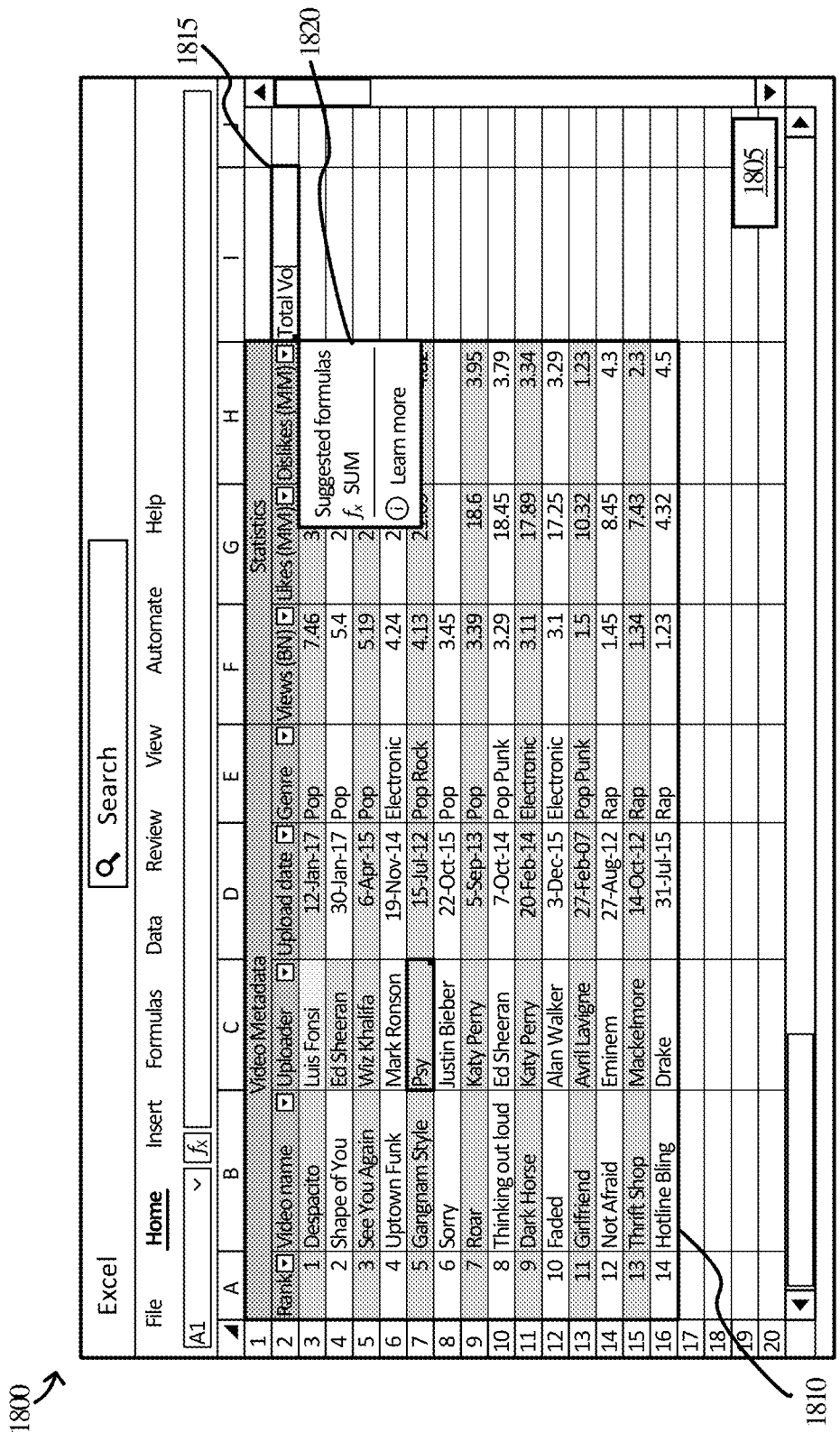

FIGS. 18A-18D illustrate a user experience of a spreadsheet process for providing formula suggestion functionality for structured spreadsheet tables in accordance with aspects of the present technology. Based on data in a table, the spreadsheet application may create a new column having a function based on the existing table data. FIG. 18A includes user interface 1800, which includes grid 1805. Grid 1805 includes table 1810. FIG. 18B further shows a header being typed into cell 1815, wherein cell 1815 shares a row with other column headers in table 1810 and is adjacent to the "Dislikes (millions)" column header. FIG. 18B further includes suggested formula box 1820, wherein suggested formula box 1820 is automatically shown in user interface 1800 in response to the header being typed into cell 1815.

Figure 18C:
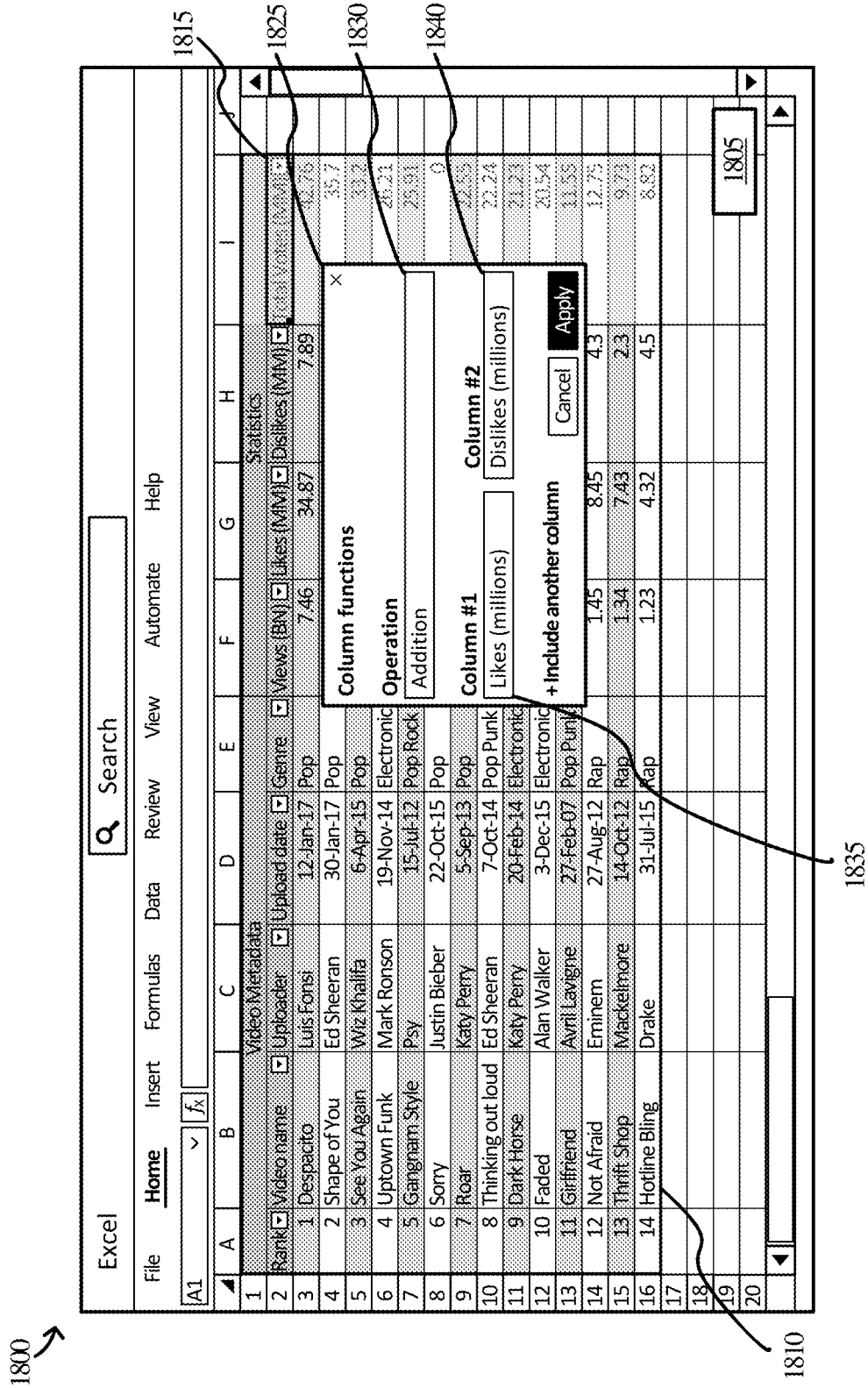
Figure 18D:
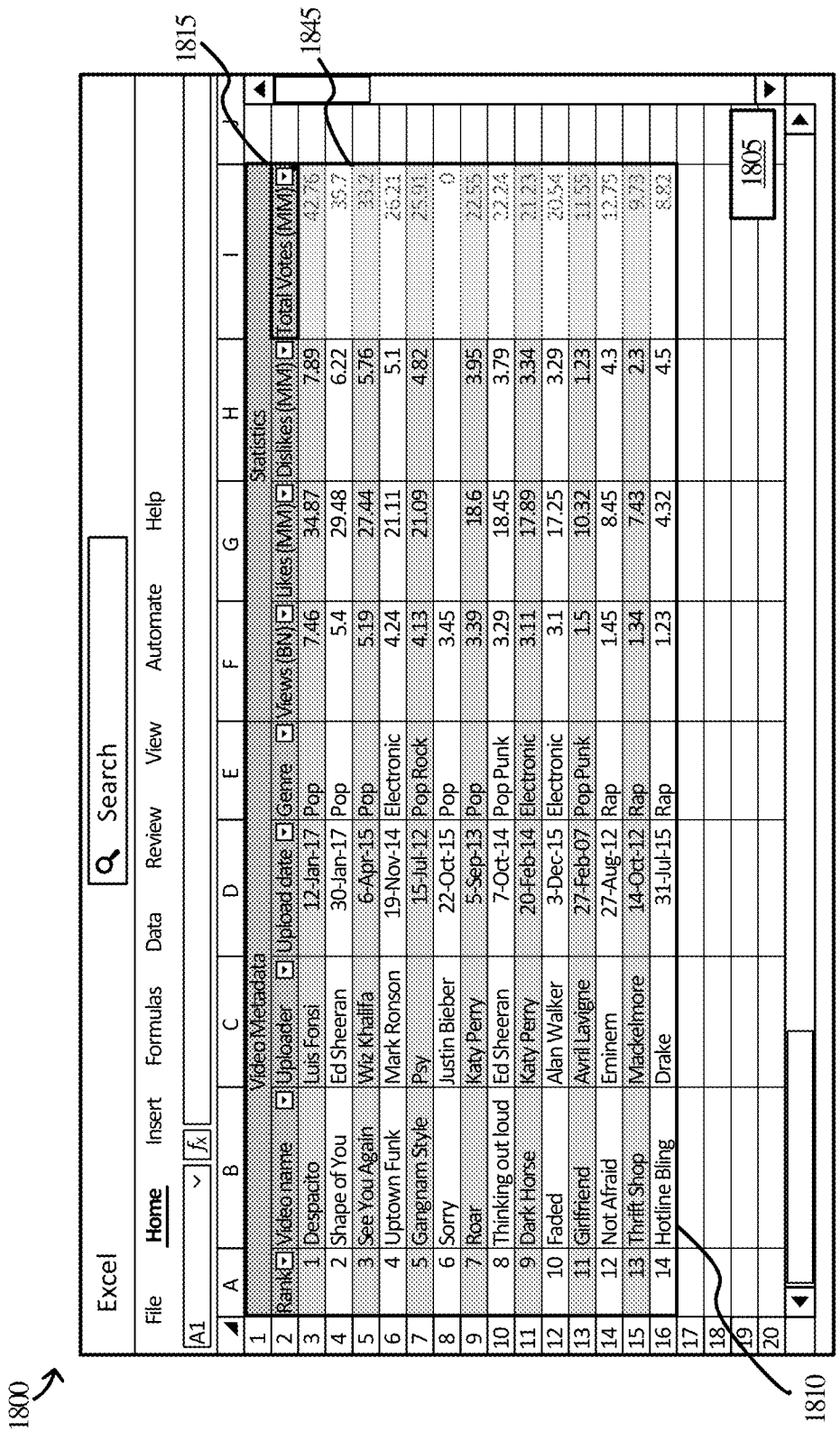

FIG. 18C illustrates column functions editor box 1825, wherein column functions editor box 1825 includes operation option 1830, column #1 option 1835, and column #2 option 1840. A user, in an implementation, may use column functions editor box 1825 and its options to build a column formula based on other columns of the table. An advantage of the present technology is that columns can be referred to by their header names, rather than having to build formulas based on cells in the body of the table. FIG. 18D shows the final result in which column 1845 is added to table 1810 after being specified via column functions editor box 1825 in the previous step.

FIG. 19 illustrates computing system 1901 to perform enhanced spreadsheet table functionality according to an implementation of the present technology. Computing system 1901 is representative of any system or collection of systems with which the various operational architectures, processes, scenarios, and sequences disclosed herein for providing enhanced spreadsheet table functionality in spreadsheet applications may be employed. Computing system 1901 may be implemented as a single apparatus, system, or device or may be implemented in a distributed manner as multiple apparatuses, systems, or devices. Computing system 1901 includes, but is not limited to, processing system 1902, storage system 1903, software 1905, communication interface system 1907, and user interface system 1909 (optional). Processing system 1902 is operatively coupled with storage system 1903, communication interface system 1907, and user interface system 1909.

Processing system 1902 loads and executes software 1905 from storage system 1903. Software 1905 includes and implements process 1906, which is representative of any of the spreadsheet table processes discussed with respect to the preceding Figures, including but not limited to operations performed on spreadsheet tables such as conditional formatting, data validation, and column functions. When executed by processing system 1902 to provide enhanced spreadsheet tables, software 1905 directs processing system 1902 to operate as described herein for at least the various processes, operational scenarios, and sequences discussed in the foregoing implementations. Computing system 1901 may optionally include additional devices, features, or functionality not discussed for purposes of brevity.

Referring still to FIG. 19, processing system 1902 may comprise a micro-processor and other circuitry that retrieves and executes software 1905 from storage system 1903. Processing system 1902 may be implemented within a single processing device but may also be distributed across multiple processing devices or sub-systems that cooperate in executing program instructions. Examples of processing system 1902 include general purpose central processing units, graphical processing units, application specific processors, and logic devices, as well as any other type of processing device, combinations, or variations thereof.

Storage system 1903 may comprise any computer readable storage media readable by processing system 1902 and capable of storing software 1905. Storage system 1903 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 1903 may also include computer readable communication media over which at least some of software 1905 may be communicated internally or externally. Storage system 1903 may be implemented as a single storage device but may also be implemented across multiple storage devices or sub-systems co-located or distributed relative to each other. Storage system 1903 may comprise additional elements, such as a controller, capable of communicating with processing system 1902 or possibly other systems.

Software 1905 (including process 1906) may be implemented in program instructions and among other functions may, when executed by processing system 1902, direct processing system 1902 to operate as described with respect to the various operational scenarios, sequences, and processes illustrated herein. For example, software 1905 may include program instructions for running spreadsheet applications having enhanced table functionality as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multithreaded, or in accordance with any other suitable execution paradigm, variation, or combination thereof. Software 1905 may include additional processes, programs, or components, such as operating system software, virtualization software, or other application software. Software 1905 may also comprise firmware or some other form of machine-readable processing instructions executable by processing system 1902.

In general, software 1905 may, when loaded into processing system 1902 and executed, transform a suitable apparatus, system, or device (of which computing system 1901 is representative) overall from a general-purpose computing system into a special-purpose computing system customized to provide enhanced spreadsheet functionality to spreadsheet applications as described herein. Indeed, encoding software 1905 on storage system 1903 may transform the physical structure of storage system 1903. The specific transformation of the physical structure may depend on various factors in different implementations of this description. Examples of such factors may include, but are not limited to, the technology used to implement the storage media of storage system 1903 and whether the computer-storage media are characterized as primary or secondary storage, as well as other factors.

For example, if the computer readable storage media are implemented as semiconductor-based memory, software 1905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1907 may include communication connections and devices that allow for communication with other computing systems (not shown) over communication networks (not shown). Examples of connections and devices that together allow for inter-system communication may include network interface cards, antennas, power amplifiers, radiofrequency circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 1901 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of networks, or variation thereof. The aforementioned communication networks and protocols are well known and need not be discussed at length here.

The following provides additional exemplary implementations of the contents disclosed herein:

Example 1: A computing apparatus comprising one or more computer readable storage media, one or more processors operatively coupled with the one or more computer readable storage media, and program instructions stored on the one or more computer readable storage media. The program instructions, when executed by the one or more processors, direct the computing apparatus to at least: detect a cell event in a spreadsheet, wherein the cell event affects one or more cells of the spreadsheet, determine that a cell of the one or more cells falls within a range that belongs to a table in the spreadsheet, identify a table column of the table to which the cell belongs, identify metadata for the table column, wherein the metadata for the table column comprises column configuration instructions, and perform at least one operation on the table column based on the metadata, wherein the table column comprises at least the cell.

Example 2: The computing apparatus of example 1, wherein the cell event comprises an event in the one or more cells that triggers a recalculation for the spreadsheet.

Example 3: Any combination of examples 1 through 2, wherein the cell event comprises an event in the one or more cells that triggers a refresh of the spreadsheet.

Example 4: Any combination of examples 1 through 3, wherein the cell event comprises an insert operation, the insert operation comprising at least one of inserting one or more new cells and pasting one or more copied cells.'

Example 5: Any combination of examples 1 through 4, wherein the cell event comprises at least one of a delete operation and a typing operation.

Example 6: Any combination of examples 1 through 5, wherein the at least one operation comprises one or more of conditional formatting of the cells in the table column and data validation of the cells in the table column.

Example 7: Any combination of examples 1 through 6, wherein the at least one operation comprises a formula applied to the table column.

Example 8: Any combination of examples 1 through 7, wherein the program instructions, when executed by the one or more processors, further direct the computing apparatus to, in response to receiving an instruction to group the table by categories in a category column of the table: arrange table entries based on their respective category such that table entries having a matching category are adjacent to each other to form a group; and insert category headers delineating the grouped categories.

Example 9: A method comprising detecting a cell event in a spreadsheet, wherein the cell event affects one or more cells of the spreadsheet, determining that a cell of the one or more cells is inside a range that makes up a table in the spreadsheet, identifying a table column of the table to which the cell belongs, identifying metadata for the table column, wherein the metadata for the table column comprises column configuration instructions, and applying the column configuration instructions to the cell.

Example 10: The method of example 9, wherein the cell event comprises an event in the one or more cells that triggers a recalculation for the spreadsheet.

Example 11: Any combination of examples 9 through 10, wherein the cell event comprises an event in the one or more cells that triggers a refresh of the spreadsheet.

Example 12: Any combination of examples 9 through 11, wherein the cell event comprises an insert operation, the insert operation comprising at least one of inserting one or more new cells and pasting one or more copied cells.

Example 13: Any combination of examples 9 through 12, wherein the cell event comprises at least one of a delete operation and a typing operation.

Example 14: Any combination of examples 9 through 13, wherein the column configuration instructions comprise one or more of conditional formatting of the cells in the table column and data validation of the cells in the table column.

Example 15: Any combination of examples 9 through 14, wherein the column configuration instructions comprise a formula applied to the table column.

Example 16: Any combination of examples 9 through 15, further comprising, in response to receiving an instruction to group the table by categories in a category column of the table: arranging table entries based on their respective category such that table entries having a matching category are adjacent to each other to form a group; and inserting category headers delineating the grouped categories.

Example 17: One or more computer readable storage media having program instructions stored thereon. The computer readable storage media, when executed by one or more processors in a computing device, direct the computing device to at least detect a cell event in a spreadsheet, wherein the cell event affects one or more cells of the spreadsheet, determine that a cell of the one or more cells is inside a range that makes up a table in the spreadsheet, identify a table column of the table to which the cell belongs, identify metadata for the table column, wherein the metadata for the table column comprises column configuration instructions, and apply the column configuration instructions to the cell.

Example 18: The one or more computer readable storage media of example 17, wherein the cell event comprises an insert operation, the insert operation comprising at least one of inserting one or more new cells and pasting one or more copied cells.

Example 19: Any combination of examples 17 through 18, wherein the column configuration instructions comprise one or more of conditional formatting of the cells in the table column and data validation of the cells in the table column.

Example 20: Any combination of examples 17 through 19, wherein the column configuration instructions comprise a formula applied to the table column.

Example 21: A computing apparatus comprising one or more computer readable storage media, one or more processors operatively coupled with the one or more computer readable storage media, and program instructions stored on the one or more computer readable storage media. The program instructions, when executed by the one or more processors, direct the computing apparatus to at least: maintain a spreadsheet table, wherein the spreadsheet table comprises at least one category column, receive an instruction to group the table based on categories in the category column, and in response to receiving the instruction, arrange table entries based on their respective category such that table entries having the same category are adjacent to each other to form a group.

Example 22: The computing apparatus of example 21, wherein the program instructions further direct the computing apparatus to add category headers delineating each group.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

It may be appreciated that, while the inventive concepts disclosed herein are discussed in the context of such productivity applications, they apply as well to other contexts such as gaming applications, virtual and augmented reality applications, business applications, and other types of software applications. Likewise, the concepts apply not just to electronic documents, but to other types of content such as in-game electronic content, virtual and augmented content, databases, and audio and video content.

Indeed, the included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A computing apparatus comprising:
    one or more computer readable storage media;
    one or more processors operatively coupled with the one or more computer readable storage media; and
    program instructions stored on the one or more computer readable storage media that, when executed by the one or more processors, direct the computing apparatus to at least:
        detect an insert operation in a spreadsheet, wherein the insert operation inserts at least one cell into the spreadsheet;
        determine that a cell of the at least one cell belongs to a table object in the spreadsheet, wherein the table object is a structured table imposed on top of a grid of the spreadsheet;
        identify a table column of the table object into which the cell was inserted;
        in response to the insert operation, identify metadata stored as a property of the table object at a table level associated with the table object, wherein the table level differs from a grid level, a cell level, and a cell range level, and wherein the metadata comprises column configuration instructions for the table column and is not stored as a property of a group of cells; and
        upon identifying the metadata for the table column, automatically perform at least one operation on the table column based on the metadata, wherein the table column comprises at least the cell.

2. The computing apparatus of claim 1 wherein the structured table comprises a group of cells formatted as a table.

3. The computing apparatus of claim 1 wherein other cells of the spreadsheet comprise an unstructured table that is not formatted as a table.

4. The computing apparatus of claim 1 wherein the insert operation comprises at least one of inserting one or more new cells and pasting one or more copied cells.

5. The computing apparatus of claim 1 wherein the insert operation comprises inserting at least one copied cell, wherein the at least one copied cell has associated metadata that differs from the metadata stored as the property of the table object.

6. The computing apparatus of claim 1 wherein the column configuration instructions comprise table level functionality including one or more of: conditional formatting, data validation, access controls, and auto-fill.

7. The computing apparatus of claim 1 wherein the table level is at least a layer of abstraction above the grid level, the cell level, and the cell range level.

8. The computing apparatus of claim 1 wherein the program instructions, when executed by the one or more processors, further direct the computing apparatus to, in response to receiving an instruction to group the table object by categories in a category column of the table object:
    arrange table entries based on their respective category such that table entries having a matching category are adjacent to each other to form a group; and
    insert category headers delineating the grouped categories.

9. A method comprising:
    detecting an insert operation in a spreadsheet, wherein the insert operation inserts at least one cell into the spreadsheet;
    determining that a cell of the at least one cell belongs to a table object in the spreadsheet, wherein the table object is a structured table imposed on top of a grid of the spreadsheet;
    identifying a table column of the table object into which the cell was inserted;
    in response to the insert operation, identifying metadata stored as a property of the table object at a table level associated with the table object, wherein the table level differs from a grid level, a cell level, and a cell range level, and wherein the metadata comprises column configuration instructions for the table column and is not stored as a property of a group of cells; and upon identifying the metadata for the table column, automatically applying the column configuration instructions to the cell.

10. The method of claim 9 wherein the structured table comprises a group of cells formatted as a table.

11. The method of claim 9 wherein other cells of the spreadsheet comprise an unstructured table that is not formatted as a table.

12. The method of claim 9 wherein the insert operation comprises at least one of inserting one or more new cells and pasting one or more copied cells.

13. The method of claim 9 wherein the insert operation comprises inserting at least one copied cell, wherein the at least one copied cell has associated metadata that differs from the metadata stored as the property of the table object.

14. The method of claim 9 wherein the column configuration instructions comprise table level functionality including one or more of: conditional formatting, data validation, access controls, and auto-fill.

15. The method of claim 9 wherein the table level is at least a layer of abstraction above the grid level, the cell level, and the cell range level.

16. The method of claim 9 further comprising, in response to receiving an instruction to group the table object by categories in a category column of the table object:

arranging table entries based on their respective category such that table entries having a matching category are adjacent to each other to form a group; and inserting category headers delineating the grouped categories.

17. One or more computer readable storage media having program instructions stored thereon that, when executed by one or more processors in a computing device, direct the computing device to at least:

detect an insert operation in a spreadsheet, wherein the insert operation inserts at least one cell into the spreadsheet;

determine that a cell of the at least one cell belongs to a table object in the spreadsheet, wherein the table object is a structured table imposed on top of a grid of the spreadsheet;

identify a table column of the table object into which the cell was inserted;

in response to the insert operation, identify metadata stored as a property of the table object at a table level associated with the table object, wherein the table level differs from a grid level, a cell level, and a cell range level, and wherein the metadata comprises column configuration instructions for the table column and is not stored as a property of a group of cells; and upon identifying the metadata for the table column, automatically apply the column configuration instructions to the cell.

18. The one or more computer readable storage media of claim 17 wherein the structured table comprises a group of cells formatted as a table.

19. The one or more computer readable storage media of claim 17 wherein other cells of the spreadsheet comprise an unstructured table that is not formatted as a table.

20. The one or more computer readable storage media of claim 17 wherein the insert operation comprises inserting at least one copied cell, wherein the at least one copied cell has associated metadata that differs from the metadata stored as the property of the table object.

* * * * *